United States Patent
Hagi et al.

(10) Patent No.: US 11,634,526 B2
(45) Date of Patent: Apr. 25, 2023

(54) RUBBER-CONTAINING GRAFT POLYMER, RESIN COMPOSITION CONTAINING RUBBER-CONTAINING GRAFT POLYMER, AND SHAPED ARTICLE OF SAME

(71) Applicant: Mitsubishi Chemical Corporation, Tokyo (JP)

(72) Inventors: Misaki Hagi, Tokyo (JP); Shinji Matsuoka, Tokyo (JP); Masashi Iimori, Tokyo (JP); Masahiro Ueda, Tokyo (JP); Hiroya Arai, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/847,125

(22) Filed: Apr. 13, 2020

(65) Prior Publication Data
US 2020/0239614 A1    Jul. 30, 2020

Related U.S. Application Data

(63) Continuation of application No. PCT/JP2018/043162, filed on Nov. 22, 2018.

(30) Foreign Application Priority Data

Nov. 27, 2017 (JP) .............................. JP2017-226679

(51) Int. Cl.
| | | |
|---|---|---|
| *C08F 279/02* | (2006.01) | |
| *C08L 67/02* | (2006.01) | |
| *C08L 69/00* | (2006.01) | |

(52) U.S. Cl.
CPC ............ *C08F 279/02* (2013.01); *C08L 67/02* (2013.01); *C08L 69/00* (2013.01); *C08L 2205/03* (2013.01)

(58) Field of Classification Search
CPC ........ C08F 2/26; C08F 279/02; C08F 283/12; C08F 283/126; C08F 283/124; C08L 51/04; C08L 51/003
See application file for complete search history.

(56) References Cited

U.S. PATENT DOCUMENTS

| | | | | |
|---|---|---|---|---|
| 5,618,879 A | * | 4/1997 | Cavivenc | ............ C09D 183/10 524/588 |
| 6,767,963 B1 | | 7/2004 | Eichenauer | |
| 2001/0039321 A1 | * | 11/2001 | Kennedy | ................. C08L 83/12 528/10 |
| 2003/0092819 A1 | | 5/2003 | Miyatake et al. | |
| 2008/0085975 A1 | | 4/2008 | Saegusa et al. | |
| 2011/0294954 A1 | | 12/2011 | Fukutani et al. | |
| 2013/0023618 A1 | * | 1/2013 | Miyake | ................. C08F 265/04 524/456 |
| 2015/0065651 A1 | * | 3/2015 | Takamido | ................. C08F 6/22 525/67 |
| 2015/0322261 A1 | | 11/2015 | Nakamoto et al. | |
| 2016/0053040 A1 | | 2/2016 | Fujikawa et al. | |
| 2016/0333130 A1 | | 11/2016 | Wakita et al. | |
| 2018/0030240 A1 | | 2/2018 | Matsuoka et al. | |

FOREIGN PATENT DOCUMENTS

| | | |
|---|---|---|
| CN | 1309676 A | 8/2001 |
| CN | 101407617 A | 4/2009 |
| CN | 102307918 A | 1/2012 |
| CN | 105646791 A | 6/2016 |
| EP | 2998361 A1 | 3/2016 |
| EP | 3034532 A2 | 6/2016 |
| JP | 48-028094 A | 4/1973 |
| JP | 63-280712 A | 11/1988 |
| JP | 2002-173501 A | 6/2002 |
| JP | 2003-020377 A | 1/2003 |
| JP | 2007-231149 A | 9/2007 |
| JP | 2009-203435 A | 9/2009 |
| JP | 2014-145029 A | 8/2014 |
| WO | 2013/157569 A1 | 10/2013 |
| WO | 2016/136726 A1 | 9/2016 |
| WO | 2017/170399 A1 | 10/2017 |

OTHER PUBLICATIONS

International Search Report issued in corresponding International Patent Application No. PCT/JP2018/043162, dated Feb. 12, 2019.
Extended European Search Report issued in corresponding European Patent Application No. 18882055.9 dated Nov. 23, 2020.
Japanese Patent Application No. 2019-555362; First Office Action dated Mar. 23, 2021; Machine Translation by Global Dossier on Jun. 18, 2021.

(Continued)

*Primary Examiner* — Jeffrey C Mullis

(74) *Attorney, Agent, or Firm* — Morgan, Lewis & Bockius LLP

(57) ABSTRACT

Provided is a rubber-containing graft polymer capable of reducing wet heat aging of a shaped article while improving the strength developing property of a thermoplastic resin. In the rubber-containing graft polymer of the present invention, a content of components having a weight-average molecular weight of 800,000 or more is 1% by mass or more with respect to an organic solvent-soluble fraction (100% by mass) of the rubber-containing graft polymer, and a phosphorus content in the rubber-containing graft polymer is 3 to 30 mmol/kg.

14 Claims, 1 Drawing Sheet

(56) References Cited

OTHER PUBLICATIONS

Decision of Rejection issued in corresponding Japanese Patent Application No. 2019-555362 dated Sep. 14, 2021.
Office Action dated Dec. 1, 2021, issued in corresponding Korean Patent Application No. 10-2020-7014251.
Office Action issued in corresponding Chinese Patent Application No. 201880066228.7 dated Apr. 29, 2022.
Decision of Rejection issued in corresponding Korean Patent Application No. 10-2020-7014251 dated Jun. 2, 2022.
Office Action issued in corresponding Chinese Patent Application No. 201880066228.7 dated Sep. 19, 2022.
Office Action issued in corresponding Japanese Patent Application No. 2021-201796 dated Nov. 8, 2022.

* cited by examiner

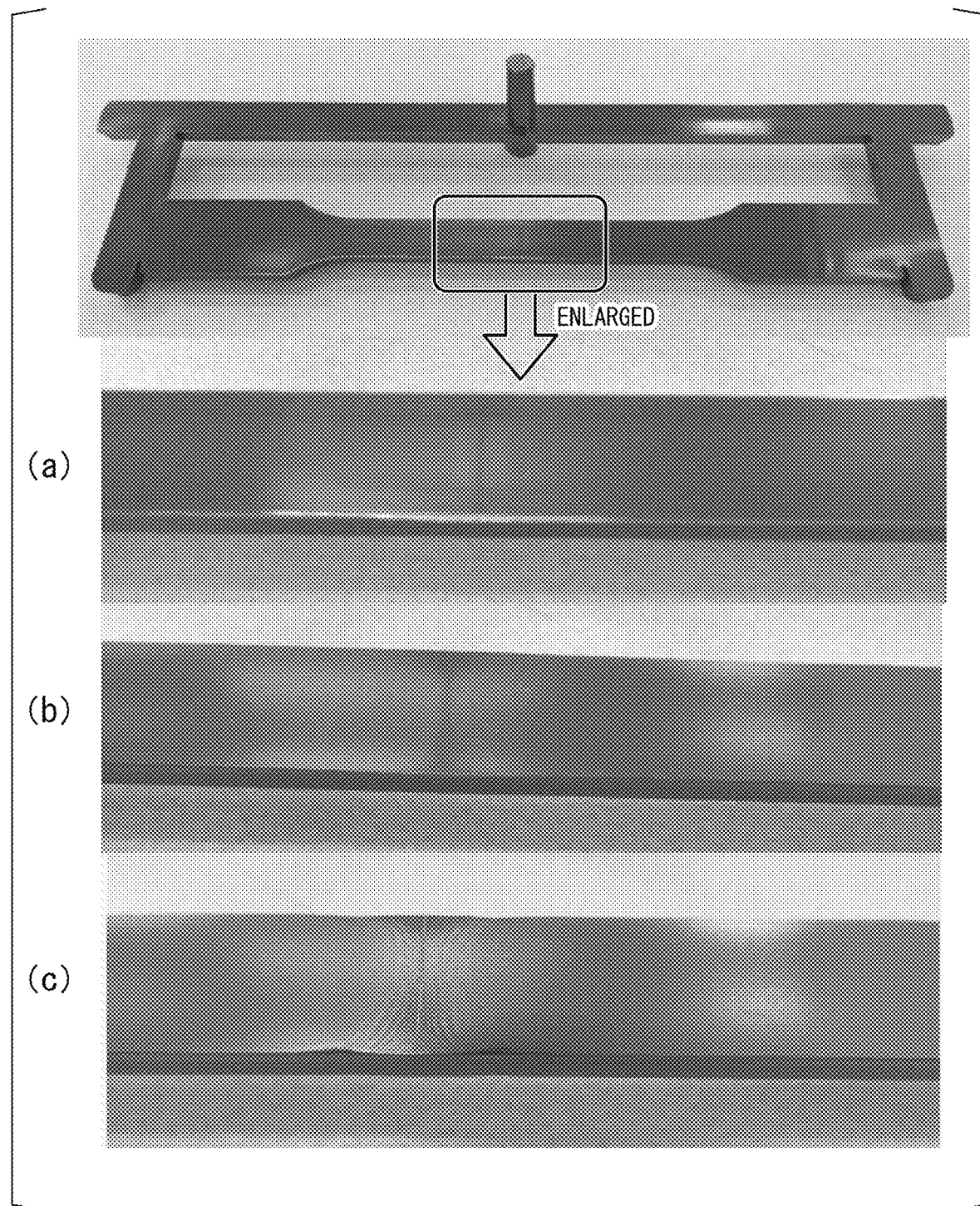

RUBBER-CONTAINING GRAFT POLYMER, RESIN COMPOSITION CONTAINING RUBBER-CONTAINING GRAFT POLYMER, AND SHAPED ARTICLE OF SAME

This application is a continuation application of International Application No. PCT/JP2018/043162, filed on Nov. 22, 2018, which claims the benefit of priority of the prior Japanese Patent Application No. 2017-226679 filed on Nov. 27, 2017, the contents of which are incorporated herein by reference.

TECHNICAL FIELD

The present invention relates to a rubber-containing graft polymer, a resin composition containing the rubber-containing graft polymer, and a shaped article of the same.

BACKGROUND ART

The rubber-containing graft polymer is a rubber-like polymer obtained by graft-polymerizing vinyl monomers. The rubber-containing graft polymer is produced by emulsion polymerization, and can be dispersed in a wide variety of resins while maintaining predetermined rubber particle diameters and rubber structures. Thus, the rubber-containing graft polymer obtained by emulsion polymerization is suitably used for a resin requiring mechanical strength.

However, the rubber-containing graft polymer obtained by emulsion polymerization has a decrease in physical properties caused by a thermal deterioration in melt kneading with a thermoplastic resin, melt molding, a heat aging test of a shaped article of a thermoplastic resin composition thus obtained, or the like by residues of a polymerization catalyst, an emulsifier, and the like used in the emulsion polymerization. In particular, in a resin having an ester bond, including a polyester resin or an aromatic polycarbonate resin, in a case where a molding temperature is increased and a case where a long-term heat resistance test is carried out, decomposition is accelerated by a polymerization catalyst or an emulsifier species, and thus, the thermal stability and the mechanical characteristics of a shaped article have sometimes been decreased. In particular, there are often acceleration of the decrease in the physical properties and occurrence of problems in quality control under an influence of a trace amount of moisture.

In addition, in order to improve the mechanical strength of a resin, it is generally considered that it is favorable to uniformly disperse rubber in the resin. However, the rubber itself has low compatibility with common thermoplastic resins, and it is difficult to uniformly disperse the rubber alone in the resin.

In Patent Literature 1, a rubber-containing graft polymer polymerized using a phosphorus-based emulsifier is blended with a thermoplastic resin such as an aromatic polycarbonate resin.

Since this rubber-containing graft polymer is produced by a production method including redox polymerization with an iron compound, a graft chain becomes short. Thus, the dispersibility of a thermoplastic resin such as a polycarbonate resin-based resin and an alloy thereof was not sufficient, and a thermoplastic resin composition containing a rubber-containing graft polymer disclosed in the related art was not sufficient in development of mechanical strength such as impact resistance and tensile strength. In addition, the strength retention in a case where a long-term wet heat test was carried out was not sufficiently satisfactory.

In Patent Literature 2, a rubber-containing graft polymer polymerized using a persulfate and a sulfonic acid-based emulsifier is blended with a polyester resin or an aromatic polycarbonate resin.

Since the rubber-containing graft polymer is produced not by a production method including redox polymerization with an iron compound but by a method including polymerization with a persulfate, the graft chain can become longer, but in a case where a long-term wet heat was carried out, there were problems such as a decrease in strength and a deterioration in a color tone.

CITATION LIST

Patent Literature

[Patent Literature 1]
International Publication under the PCT No. WO 2013/157569
[Patent Literature 2]
Japanese Unexamined Patent Application First Publication No. 2002-173501

SUMMARY OF INVENTION

Technical Problem

According to the present invention, it is possible to reduce a decrease in physical properties accompanied by a thermal deterioration of a shaped article, and in particular, a reduction in wet heat aging while improving a strength developing property of a resin composition including a rubber-containing graft polymer including a rubber-containing graft polymer and a thermoplastic resin.

Solution to Problem

The present inventors have conducted repeated studies to solve the problems, and as a result, they have led to completion of the present invention.

The present invention has the following aspects.

[1] A rubber-containing graft polymer,
in which a content ratio of components having a weight-average molecular weight of 800,000 or more is 1% by mass or more with respect to an organic solvent-soluble fraction (100% by mass) of the rubber-containing graft polymer, and
a phosphorus content in the rubber-containing graft polymer is 3 to 30 mmol/kg.

[2] The rubber-containing graft polymer according to [1],
in which a sodium content in the rubber-containing graft polymer is 30 ppm by mass or less.

[3] The rubber-containing graft polymer according to [1] or [2],
in which a weight-average molecular weight of the organic solvent-soluble fraction is 250,000 or more.

[4] The rubber-containing graft polymer according to any one of [1] to [3],
in which a content ratio of components having a weight-average molecular weight of 800,000 or more with respect to the organic solvent-soluble fraction (100% by mass) is 1.3% by mass or more.

[5] The rubber-containing graft polymer according to any one of [1] to [4],
in which a content ratio of components having a weight-average molecular weight of 800,000 or more with respect to the organic solvent-soluble fraction (100% by mass) is 5% by mass or more.

[6] The rubber-containing graft polymer according to any one of [1] to [5], in which a volume-average particle diameter of the rubber to be grafted is 50 to 400 nm.

[7] A rubber-containing graft polymer obtained by polymerizing grafting vinyl monomers including 95% by mass or more of methyl methacrylate to a rubber latex using a persulfate, the rubber latex being obtained by polymerizing vinyl monomers including 100 parts by mass of an acrylate (a1) and 0.1 to 3 parts by mass of an allyl methacrylate (a2) using a persulfate and a phosphorus-based emulsifier.

[8] The rubber-containing graft polymer according to [7], in which the vinyl monomers includes 100 parts by mass of the acrylate (a1) and 0.1 to 0.7 parts by mass of the allyl methacrylate (a2).

[9] A rubber-containing graft polymer obtained by emulsion-graft-polymerizing grafting monomers containing an alkyl methacrylate ester to a butadiene-based rubber latex using a persulfate and a phosphorus-based emulsifier, the butadiene-based rubber latex being obtained by polymerization using a phosphorus-based emulsifier.

[10] A rubber-containing graft polymer obtained by emulsion-graft-polymerizing grafting monomers containing an alkyl methacrylic ester to a polyorganosiloxane-based rubber latex using a persulfate and a phosphorus-based emulsifier.

[11] The rubber-containing graft polymer according to any one of [7] to [10], obtained by coagulation with calcium acetate.

[12] A resin composition containing a rubber-containing graft polymer, comprising:
the rubber-containing graft polymer according to any one of [1] to [11]; and
a thermoplastic resin (B).

[13] The resin composition containing a rubber-containing graft polymer according to [12],
in which the thermoplastic resin (B) includes a polyester resin.

[14] The resin composition containing a rubber-containing graft polymer according to [12] or [13],
in which the thermoplastic resin (B) includes an aromatic polycarbonate resin.

[15] The resin composition containing a rubber-containing graft polymer according to any one of [12] to [14],
in which the thermoplastic resin (B) an alloy of a polyester resin and an aromatic polycarbonate resin.

[16] A shaped article obtained by shaping the resin composition containing a rubber-containing graft polymer according to any one of [12] to [15].

[17] The shaped article according to [16],
in which is the shaped article is an injection shaped article.

Advantageous Effects of Invention

The rubber-containing graft polymer of the present invention can reduce the wet heat aging of a shaped article while improving the strength developing property of a resin composition containing the rubber-containing graft polymer, which includes a rubber-containing graft polymer and a thermoplastic resin.

The resin composition containing the rubber-containing graft polymer of the present invention has a high strength developing property and low wet heat aging of a shaped article.

The shaped article of the present invention has low wet heat aging.

BRIEF DESCRIPTION OF DRAWINGS

FIG. 1 is an appearance photograph showing the condition at the time of obtaining a specimen for measuring a weld strength from a pellet of a resin composition of each of Examples or each of Comparative Examples.

DESCRIPTION OF EMBODIMENTS

Hereinafter, embodiments of the present invention will be described in detail.

[Rubber-Containing Graft Polymer]

The rubber-containing graft polymer of the present invention has a content ratio of components having a weight-average molecular weight of 800,000 or more of 1% by mass or more with respect to 100% by mass of an organic solvent-soluble fraction, and has a phosphorus content per weight of the rubber-containing graft polymer of 3 to 30 mmol/kg.

The rubber-containing graft polymer of the present invention (hereinafter also referred to as a "rubber-containing graft polymer (A)") is a polymer (graft latex) obtained by graft-polymerizing grafting vinyl monomers to a rubber-like polymer (rubber latex). For example, the rubber-containing graft polymer can be produced by graft-polymerizing grafting vinyl monomers to a rubber-like polymer obtained by polymerizing vinyl monomers in an aqueous medium in the presence of an emulsifier.

Hereinafter, a component (a component formed by graft-polymerizing a grafting vinyl monomer) derived from graft polymerization using a grafting vinyl monomer, constituting the rubber-containing graft polymer, is also referred to as a "graft component".

As the rubber-like polymer that can be used in the present invention, those having a glass transition temperature of 0° C. or lower can be used.

In a case where the glass transition temperature of the rubber-like polymer is 0° C. or lower, the impact strength of a shaped article obtained from the resin composition of the present invention, which is represented by a value of the Charpy impact test, is improved.

Specific examples of the rubber-like polymer include the following ones:

a butadiene rubber, a styrene/butadiene copolymer rubber, a silicone rubber, a silicone/acrylic composite rubber (rubber obtained by polymerizing one kind or two or more kinds of vinyl monomers including an acrylate in the presence of a rubber-like polymer obtained from monomers mainly formed of dimethylsiloxane), an acrylonitrile/butadiene copolymer rubber, an acrylic rubber such as polybutyl acrylate, polyisoprene, polychloroprene, an ethylene/propylene rubber, an ethylene/propylene/diene terpolymer rubber, a block copolymer such as a styrene/butadiene block copolymer rubber and a styrene/isoprene block copolymer rubber, and hydrogenated products thereof.

In a cold strict, it is required to improve the impact strength of a shaped article at a lower temperature (−20° C. or lower), and thus, the butadiene rubber, the styrene/butadiene copolymer rubber, or the silicone/acryl composite rubber, having a glass transition temperature of −20° C. or lower, is preferable.

A volume-average particle diameter (Dv) of the rubber-like polymer that can be used in the present invention is preferably 50 to 400 nm, more preferably 50 to 300 nm, and still more preferably from 70 to 250 nm.

In a case where the particle diameter of the rubber-like polymer is within the range, the molding appearance is easily improved while not scattering light, stress relaxation by the rubber becomes sufficient, and the impact strength easily reaches a sufficient value.

The volume-average particle diameter of the rubber-like polymer can be measured by a nanoparticle size distribution measuring device using a light scattering method or a capillary particle size distribution meter using a capillary hydrodynamic fractionation (CHDF) method, and is preferably measured by the light scattering method.

The volume-average particle diameter of the rubber-like polymer can be adjusted by adjusting the amount of the emulsifier in the production of the rubber-like polymer by emulsion polymerization.

A particle size distribution of the rubber-like polymer is preferably narrow, and specifically, it is preferably 1.5 or less. The particle size distribution can be quantified with a ratio (Dv/Dn) between a volume-average particle diameter (Dv) and a number-average particle diameter (Dn).

The particle size distribution can be reduced by adjusting the amount of the emulsifier in the production of the rubber-like polymer by emulsion polymerization, and thus, in order to adjust the particle size distribution to 1.5 or less, it is preferable to produce the rubber-like polymer by emulsion polymerization.

The grafting vinyl monomers which can be graft-polymerized to the rubber-containing graft polymer of the present invention is preferably methyl methacrylate or a vinyl monomer mixture containing methyl methacrylate as a main component.

Other vinyl monomers may also be included in the vinyl monomer mixture as long as a content thereof is within 5% by mass with respect to a total mass of the grafting vinyl monomer to be graft-polymerized to the rubber-like polymer. Examples of such other vinyl monomers include aromatic vinyl compounds such as styrene and α-methylstyrene; acrylic esters such as methyl acrylate and butyl acrylate; and methacrylic esters such as ethyl methacrylate, and these may be copolymerized with methyl methacrylate.

It is preferable to select the vinyl monomers so that the glass transition temperature of a polymer or copolymer obtained by polymerizing (homopolymerizing or copolymerizing two or more kinds of) the vinyl monomers is 70° C. or higher from the viewpoint of powder characteristics (fluidity and particle diameters of the powder) obtained from a subsequent coagulation step.

A glass transition temperature of the polymer formed from the grafting vinyl monomers to be graft-polymerized to the rubber-like polymer is more preferably 80° C. or higher, and more preferably 90° C. to 105° C. For example, a copolymer of methyl methacrylate and butyl acrylate tends to have a glass transition temperature in the range of 90° C. to 105° C., and is preferably used.

A content ratio of the rubber-like polymer in the rubber-containing graft polymer (A) is preferably 50% to 95% by mass, more preferably 70% to 94% by mass, still more preferably 75% to 93% by mass, particularly preferably 77% to 92% by mass, and most preferably 80% to 91% by mass, from the viewpoint of the impact strength of a shaped article.

The rubber-containing graft polymer (A) can be usually obtained by bringing a rubber-like polymer into a latex state in the presence of an emulsifier and water, and adding grafting vinyl monomers to the rubber-like polymer to perform graft polymerization.

In the rubber-like polymer, rubber crosslinking components as components which are crosslinked and insoluble in an organic solvent, and rubber non-crosslinking components as components which are polymerized without being crosslinked are present. It is preferable that the content ratio of the rubber crosslinking components is larger in the rubber-like polymer.

A graft chain in the rubber-containing graft polymer of the present invention is a polymer having structural units derived from grafting vinyl monomers which are chemically bonded to the rubber crosslinking components in the rubber-like polymer.

The grafting vinyl monomers to be subjected to graft polymerization can be classified into "vinyl monomers mgp" which are actually chemically bonded to the rubber-like polymer, "vinyl monomers mfp" which are polymerized without being chemically bonded to the rubber-like polymer to generate a free polymer, and "vinyl monomers mfm" which do not undergo a polymerization reaction. Among the vinyl monomers mgp which are chemically bonded to the rubber-like polymer, the grafting vinyl monomers chemically bonded to the "rubber crosslinking components" as components which are crosslinked and insoluble in an organic solvent are defined as the "graft chain" of the present invention (a graft chain in "Rg" which will be described later). It is preferable that the content ratio of the vinyl monomers chemically bonded to the "rubber crosslinking components" as components which are crosslinked and insoluble in an organic solvent is larger in the vinyl monomers mgp.

In a case where the amount of the vinyl monomers chemically bonded to the "rubber crosslinking components" in the vinyl monomers mgp chemically bonded to the rubber-like polymer in the rubber-containing graft polymer (A) is large, the rubber is easily dispersed in a thermoplastic resin (B) which will be described later, and the interface strength between the thermoplastic resin (B) and the rubber is improved. As the dispersibility of the rubber-containing graft polymer (A) is better and the interfacial strength is stronger, the impact strength of the shaped article is further improved, which is thus preferable.

Almost all of the vinyl monomers mfm which do not undergo a polymerization reaction are removed in a subsequent recovery step (a coagulation or spray recovery step which will be described later, and a drying step for the obtained powder).

The rubber-containing graft polymer (A) of the present invention is constituted with the following five components.

Rg: rubber crosslinking components and a graft chain derived from grafting vinyl monomers which are chemically bonded thereto R0: rubber crosslinking components which are not grafted Ng: rubber non-crosslinking components and a graft chain derived from grafting vinyl monomers which are chemically bonded thereto N0: rubber non-crosslinking components which are not grafted "Free polymer Pf": a polymer or copolymer derived from grafting vinyl monomers which are not grafted to a rubber-like polymer.

The organic solvent-insoluble fraction of the rubber-containing graft polymer (A) is a component (Rg+R0) derived from the rubber crosslinking component.

The organic solvent which can be used for extraction of the organic solvent-insoluble fraction and the organic solvent-soluble fraction of the rubber-containing graft polymer (A) is not particularly limited as long as it does not chemically modify the rubber-containing graft polymer (A), and has sufficient solubility for each of polymers constituting the rubber-containing graft polymer (A) in a case of non-crosslinking. Preferred examples of the organic solvent include acetone and tetrahydrofuran.

From the viewpoint of workability, acetone is preferable from the viewpoint of high volatility and ease in distillation of the solvent. However, since acetone has low solubility in a polymer having styrene as a main component, tetrahydrofuran is preferable in a case where the rubber-containing graft polymer (A) includes structural units derived from styrene.

(Method for Measuring Organic Solvent-Soluble Fraction and Organic Solvent-Insoluble Fraction)

With regard to the organic solvent-insoluble fraction of the rubber-containing graft polymer (A), the organic solvent-insoluble fraction can be quantified by thoroughly mixing a precisely weighed a rubber-containing graft polymer sample and an organic solvent, allowing the mixture to stand, then performing an operation of centrifuging the mixture to separate the organic solvent-soluble fraction and the organic solvent-insoluble fraction a plurality of times, and removing the organic solvent from the combined organic solvent-insoluble fraction.

As a specific example of the method for measuring the organic solvent-soluble fraction and the organic solvent-insoluble fraction of the rubber-containing graft polymer (A), an example in which acetone is used as the organic solvent will be described. In a case where an organic solvent other than acetone is used as the organic solvent, the measurement can be carried out according to the following example, while replacing acetone with the solvent.

In a 50-mL sample vial, 1 g of a rubber-containing graft polymer sample (a mass thereof is referred to as [W0] (g)) is precisely weighed, 30 mL of acetone is added thereto, a lid was closed, and the mixture is stirred by hand, left to stand for 8 hours, and centrifuged at a temperature of 4° C. and a rotation speed of 14,000 rpm for 60 minutes using a centrifugal separator (Hitachi High-Speed Refrigerated Centrifuge (CR21G), manufactured by Hitachi Koki Co., Ltd.) to separate the soluble fraction and the insoluble fraction. However, in a case where the acetone is cloudy after the centrifugation at a rotation speed of 14,000 rpm for 60 minutes, the mixture is centrifuged at a rotation speed of 14,000 rpm for 300 minute to separate the soluble fraction and the insoluble fraction in a state where the acetone is not cloudy. In a case where the centrifuge is carried out at 14,000 rpm for 60 minutes, 30 mL of acetone is added again to the obtained insoluble fraction and dispersed, and an operation of centrifuging the mixture in the centrifugal separator to separate the soluble fraction and the insoluble fraction is repeated three times. After centrifugation, the insoluble fraction is set in an inert oven (DN610I, manufactured by Yamato Scientific Co., Ltd.) under a nitrogen atmosphere and heated at 40° C. overnight to remove acetone. Thereafter, the resultant is dried in vacuo at 40° C. and the insoluble fraction is weighed (a mass thereof is referred to as [W1] (g)), and from the results, a ratio of the acetone-insoluble fraction is determined by the following equation.

Acetone-insoluble fraction (% by mass)=([W1]/[W0])×100

In a case where the content ratio of the organic solvent-insoluble fraction with respect to 100% by mass of the rubber-containing graft polymer is 92 to 99.5% by mass, it can be determined that the "rubber non-crosslinking components" are sufficiently in a small amount, and the graft chain can be considered to have the same polymer as that of the "free polymer Pf" (the one which is not grafted to the rubber-like polymer). The content ratio of the organic solvent-insoluble fraction with respect to 100% by mass of the rubber-containing graft polymer is preferably 94% to 99.5% by mass, more preferably 96% to 99.5% by mass, and particularly preferably 98% to 99% by mass.

In this case, the rubber-containing graft polymer can be considered to be composed of the Rg and the "free polymer Pf".

The "graft chain" of the present invention is a polymer having structural units derived from grafting vinyl monomers which are chemically bonded to the rubber crosslinking components insoluble in an organic solvent of the rubber-like polymer.

(Measurement of Weight-Average Molecular Weight (Mw) of Organic Solvent Extract)

A compositional ratio of the organic solvent-soluble fraction was measured using gel permeation chromatography (GPC).

Measuring device: HLC-8320 Type manufactured by Tosoh Corporation

Sample concentration: 2 mg/mL tetrahydrofuran solution for each component

Guard column: TSK-guard column SUPER H-H-H (manufactured by Tosoh Corporation)

Separation column: TSK-GEL SUPER HM-H (6.0 mmφ× 150 mm, manufactured by Tosoh Corporation), two in series connected Detector: Differential refractometer (RI)

Separation column temperature: 40° C.

Moving phase: Tetrahydrofuran (flow rate: 0.6 ml/min)

Sample injection volume: 10 μl

Method for creating a calibration curve: A calibration curve (cubic equation) was created using 11 kinds of polystyrenes with known molecular weights (Mw: 1,013 to 6,770,000) and 2,2'-methylenebis(6-tert-butyl-p-cresol) (molecular weight: 340), and the weight-average molecular weight was determined.

An integrated molecular weight distribution diagram was created and the ratios of the components having a molecular weight of 800,000 or more were calculated.

In the rubber-containing graft polymer of the present invention, the content ratio of the components having a weight-average molecular weight of 800,000 or more is 1% by mass or more, preferably 1.3% by mass or more, more preferably 5% by mass or more, and still more preferably 10% by mass or more, with respect to 100% by mass of the organic solvent-soluble fraction.

In a case where the content ratio of the components having a weight-average molecular weight of 800,000 or more in the organic solvent-soluble fraction is within the range, it is easy to promote a higher efficiency of the dispersibility of the rubber-containing graft polymer in a thermoplastic resin.

As the dispersibility of the rubber-containing graft polymer in the thermoplastic resin is higher, the mechanical strength represented by impact strength is improved. Further, as the dispersibility of the rubber-containing graft polymer in the thermoplastic composition resin is higher, a better mechanical strength is developed, irrespective of the conditions under which the thermoplastic resin is melt-molded by injection molding or the like.

In the rubber-containing graft polymer (A) of the present invention, the weight-average molecular weight of the organic solvent-soluble fraction is preferably 250,000 or more, more preferably 350,000 or more, and still more preferably 500,000 or more.

In a case where the weight-average molecular weight of the organic solvent-soluble fraction is the lower limit value or more, the mechanical strength represented by impact strength tends to be excellent.

(Polymerization Initiator)

Examples of a polymerization initiator which can be used in the graft polymerization of the rubber-containing graft polymer of the present invention include a peroxide and an azo-based initiator.

In the graft polymerization, redox polymerization with an iron compound is frequently used, but in the redox polymerization with the iron compound, the weight-average molecular weight of the graft chain is likely to be less than 250,000 in terms of a conversion value, and the thermoplastic resin is easily decomposed.

In a case where the graft chain is lengthened, a persulfate is preferably used, and examples of the persulfate include ammonium persulfate (APS), sodium persulfate (NPS), and potassium persulfate (KPS).

(Acrylic Rubber-Like Polymer)

In a case where the rubber-like polymer used for the rubber-containing graft polymer (A) of the present invention is an acrylic rubber, an allyl methacrylate or a triallyl isocyanurate is mainly used as a graft crossing agent. With the allyl methacrylate, the rubber-containing graft polymer (A) of the present invention is easily produced.

By way of an example, a "rubber-like polymer" (rubber latex) is produced by polymerizing vinyl monomers including 100 parts by mass of an acrylate (a1) and 0.1 to 3 parts by mass of an allyl methacrylate (a2), and preferably including 100 parts by mass of the acrylate (a1) and 0.1 to 0.7 parts by mass of the allyl methacrylate (a2) with a persulfate or polymerizing them using a persulfate and a phosphorus-based emulsifier, and the rubber-containing graft polymer (A) can be obtained by polymerizing grafting vinyl monomers including 95% by mass or more of methyl methacrylate using a persulfate to the rubber latex. In the rubber-containing graft polymer produced by such the method, the weight-average molecular weight of the organic solvent-soluble fraction can be 250,000 or more, and the content ratio of the components having a weight-average molecular weight of 800,000 or more in the organic solvent-soluble fraction can be 1% by mass or more.

In the above production method, at the time of polymerizing the vinyl monomers including 100 parts by mass of the acrylate (a1) and 0.1 to 3 parts by mass of the allyl methacrylate (a2) with the persulfate to produce the rubber latex or before polymerizing the grafting vinyl monomers including 95% by mass or more of methyl methacrylate, it is preferable that 0.5 to 3.0 parts by mass, and preferably 1.0 to 2.8 parts by mass of aromatic vinyl monomers with respect to 100 parts by mass of the acrylate (a1) in the rubber latex are copolymerized from the viewpoint of increasing the organic solvent-insoluble fraction.

(Diene-Based Rubber-like Polymer)

A latex containing a diene-based rubber-like polymer (diene-based rubber latex) can be produced, for example, by subjecting one or more kinds of vinyl monomers that can be copolymerized with 1,3-butadiene to emulsion polymerization with 1,3-butadiene.

A ratio of 1,3-butadiene with respect to 100% by mass of a total amount of the monomers used for the production of the diene-based rubber-like polymer is preferably 60% by mass or more, and more preferably 65% by mass or more.

In a case where the ratio of 1,3-butadiene with respect to 100% by mass of the total amount of the monomers is the lower limit value or more, sufficient impact resistance is easily obtained.

(Polyorganosiloxane-Based Rubber-Like Polymer)

The polyorganosiloxane-based rubber-like polymer (polyorganosiloxane-based rubber latex) is one kind or two kinds selected from a polyorganosiloxane rubber (S-1) or a polyorganosiloxane composite rubber (S-2).

(Polyorganosiloxane Rubber (S-1))

The polyorganosiloxane rubber (S-1) can be obtained by emulsion-polymerizing an organosiloxane mixture composed of an organosiloxane, a graft crossing agent for a polyorganosiloxane (hereinafter also referred to as a "siloxane crossing agent"), and as necessary, a crosslinking agent for a polyorganosiloxane (hereinafter also referred to as a "siloxane crosslinking agent"), a siloxane oligomer having a terminal blocking group, and the like.

As the organosiloxane, any of a chained organosiloxane or a cyclic organosiloxane can be used, but the cyclic organosiloxane is preferable since it has high polymerization stability and a high polymerization rate.

As the cyclic organosiloxane, a cyclic organosiloxane having a three or more-membered ring is preferable, and a cyclic organosiloxane having a three- to six-membered ring is more preferable.

Examples of the cyclic organosiloxane include hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyltetraphenyl cyclotetrasiloxane, and octaphenyl cyclotetrasiloxane. These may be used alone or in combination of two or more kinds thereof.

As the siloxane crossing agent, those capable of being bonded to the organosiloxane via a siloxane bond to form a bond with a vinyl monomer such as a monomer constituting a poly(meth)acrylic ester or a vinyl monomer are preferable. In consideration of the reactivity with the organosiloxane, an alkoxysilane compound having a vinyl group is preferable.

By using the siloxane crossing agent, a polyorganosiloxane having a functional group that can be polymerized with any vinyl copolymer can be obtained. By incorporating a functional group that can be polymerized with any vinyl monomer into the polyorganosiloxane, the polyorganosiloxane can be chemically bonded to the polyalkyl (meth) acrylic ester or the vinyl monomer.

Examples of the siloxane crossing agent include a siloxane represented by Formula (I).

In Formula I ), $R^1$ represents a methyl group, an ethyl group, a propyl group, or a phenyl group. $R^2$ represents an organic group in the alkoxy group, and examples thereof include a methyl group, an ethyl group, a propyl group, and a phenyl group. n represents 0, 1, or 2. R represents any of groups represented by Formulae (I-1) to (I-4).

In these formulae, $R^3$ and $R^4$ each represent hydrogen or a methyl group, and p represents an integer of 1 to 6.

Examples of the functional group represented by Formula (I-1) include a methacryloyloxyalkyl group.

Examples of the siloxane having this group include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane.

Examples of the functional group represented by Formula (I-2) include a vinylphenyl group.

Examples of the siloxane having the group include vinylphenylethyldimethoxysilane.

Examples of the siloxane having a functional group represented by Formula (I-3) include vinyltrimethoxysilane and vinyltriethoxysilane.

Examples of the functional group represented by Formula (I-4) include a mercaptoalkyl group.

Examples of the siloxane having the group include γ-mercaptopropyldimethoxymethylsilane, γ-mercaptopropylmethoxydimethylsilane, γ-mercaptopropyldiethoxymethylsilane, γ-mercaptopropylethoxydimethylsilane, and γ-mercaptopropyltrimethoxysilane.

These siloxane crossing agents may be used alone or in combination of two or more kinds thereof.

As the siloxane crosslinking agent, those having three or four functional groups capable of being bonded to the organosiloxane are preferable. Examples of the siloxane crosslinking agent include trialkoxyalkylsilanes such as trimethoxymethylsilane; trialkoxyarylsilanes such as triethoxyphenylsilane; and tetraalkoxysilanes such as tetramethoxysilane, tetraethoxysilane, tetra-n-propoxysilane, and tetrabutoxysilane. These may be used alone or in combination of two or more kinds thereof. Among these, the tetraalkoxysilane is preferable, and the tetraethoxysilane is more preferable.

The siloxane oligomer having a terminal blocking group refers to a siloxane oligomer which has an alkyl group or the like at a terminal of the organosiloxane oligomer and terminates the polymerization of the polyorganosiloxane.

Examples of the siloxane oligomer having a terminal blocking group include hexamethyldisiloxane, 1,3-bis(3-glycidoxypropyl)tetramethyldisiloxane, 1,3-bis(3-aminopropyl)tetramethyldisiloxane, and methoxytrimethylsilane.

A content ratio of the organosiloxane in the organosiloxane mixture (100% by mass) is preferably 60% to 99.9% by mass, more preferably 70% to 99.9% by mass.

A content of the siloxane crossing agent in the organosiloxane mixture (100% by mass) is preferably 0.1% to 10% by mass.

The content of the siloxane crosslinking agent in the organosiloxane mixture (100% by mass) is preferably 0% to 30% by mass.

(Polyorganosiloxane Composite Rubber (S-2))

The polyorganosiloxane composite rubber (S-2) contains the polyorganosiloxane rubber (S-1) and a vinyl polymer for a composite rubber. Preferably, the polyorganosiloxane composite rubber (S-2) includes the polyorganosiloxane rubber (S-1) and a polyalkyl(meth)acrylate rubber.

The vinyl polymer for a composite rubber is obtained by polymerizing vinyl monomers for a composite rubber, and as necessary, a crosslinkable monomer or an acryl crossing agent.

Examples of the vinyl monomers for a composite rubber include alkyl acrylates such as methyl acrylate, ethyl acrylate, n-propyl acrylate, and n-butyl acrylate; alkyl methacrylates such as methyl methacrylate, ethyl methacrylate, n-propyl methacrylate, n-butyl methacrylate, and i-butyl methacrylate; aromatic vinyl monomers such as styrene and α-methylstyrene; and vinyl cyanide monomers such as acrylonitrile and methacrylonitrile.

As the vinyl monomers for a composite rubber, the n-butyl acrylate is preferable since a shaped article has excellent impact resistance.

The crosslinkable monomer is a polyfunctional monomer having two or more polymerizable unsaturated bonds. For example, allyl methacrylate, triallyl cyanurate, triallyl isocyanurate, divinylbenzene, ethylene glycol dimethacrylate, propylene glycol dimethacrylate, 1,3-butyleneglycol dimethacrylate, 1,4-butyleneglycol dimethacrylate, 1,6-hexanediol diacrylate, and triallyl trimellitate, and these can be used alone or in combination of two or more kinds thereof.

The acryl crossing agent is a polyfunctional monomer having two or more polymerizable unsaturated bonds having different reactivities.

By allowing the acryl crossing agent to have groups having different reactivities, in a case of being polymerized together with other components, the unsaturated groups are incorporated into the composite rubber in a state where the unsaturated groups are preserved, whereby a graft copolymer can be formed. Examples of the acryl crossing agent include allyl methacrylate, triallyl cyanurate, and triallyl isocyanurate, which can be used alone or in combination of two or more kinds thereof.

Since the acryl crossing agent has two or more polymerizable unsaturated bonds as with the crosslinkable monomer, it also has a function as a crosslinking agent.

The crosslinkable monomer is preferably used in an amount of 0 to 15 parts, and more preferably 0.1 to 10 parts, with respect to 100 parts by mass of the vinyl monomers for a composite rubber.

In a case where the amount of the crosslinkable monomer used is the upper limit or less, a shaped article tends to have excellent impact resistance.

The acryl crossing agent is preferably used in an amount of 0 to 15 parts, and more preferably 0.1 to 10 parts, with respect to 100 parts by mass of the vinyl monomers for a composite rubber.

In a case where the amount of the acryl crossing agent is the upper limit value or less, a shaped article tends to have excellent impact resistance.

The content of the polyorganosiloxane rubber (S-1) is preferably 0.1% to 99.9% by mass, more preferably 5% to 99.9% by mass, and particularly preferably 7% to 99.9% by mass, with respect to 100% by mass of the polyorganosiloxane composite rubber (S-2).

In a case where the content of the polyorganosiloxane rubber (S-1) is the lower limit value or more, a shaped article tends to have excellent impact resistance. In a case where the content of the polyorganosiloxane rubber (S-1) is the upper limit value or less, the heat resistance of a shaped article tends to be excellent.

(Emulsifier)

The rubber-containing graft polymer (A) of the present invention can be produced by emulsion polymerization.

As the emulsifier used in the emulsion polymerization, a known emulsifier can be used, but a phosphoric acid-based compound or a metal salt of the phosphoric acid-based compound (phosphorus-based emulsifier) is preferable from the viewpoint that a thermoplastic resin composition including the rubber-containing graft polymer (A) has improved wet heat aging resistance.

A method for producing the rubber-containing graft polymer (A) may include the following steps:
- (a1) a step of polymerizing predetermined monomers in water in the presence of a polymerization emulsifier to form a rubber-like polymer
- (a2) a step of grafting predetermined monomers to a rubber-like polymer (core) in water in the presence of a polymerization emulsifier The phosphorus-based emulsifier is preferably used in both the step (a1) and the step (a2). Incidentally, also in a coagulation step subsequent to the emulsion polymerization, the phosphorus-based emulsifier can be additionally introduced.

A metal salt of sulfonic acid is used in many rubber-containing graft polymers (A), but sulfur derived from oxo acid is not preferable because it promotes thermal deterioration of a thermoplastic resin.

From the viewpoint that the stability during polymerization is increased, the metal salt of the phosphoric acid-based compound is preferably a compound having a group represented by $—PO_3M_2$ or $—PO_2M$ (in which M is hydrogen, an alkali metal, or an alkaline earth metal) in the molecule, and more preferably a compound having a polyoxyethylene alkyl ether phosphoric ester represented by General Formula (II).

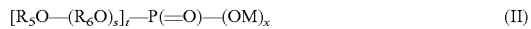
(II)

(In the formula, $R_5$ is a linear or branched alkyl group having 10 to 18 carbon atoms, $R_6$ is a linear or branched alkylene group having 2 or 3 carbon atoms, M is hydrogen, an alkali metal, or alkaline earth metal, s is an integer of 1 to 20, t is 1 or 2, x is 1 or 2, and t+x is 3.)

Examples of the compound represented by General Formula (II) include linear alkyloxy polyoxyethylene phosphates such as mono-n-dodecyloxyhexaoxyethylene phosphate, di-n-dodecyloxyhexaoxyethylene phosphate, mono-n-tetradecyloxyhexaoxyethylene phosphate, and di-n-tetradecyloxyhexaoxyethylene phosphate; branched alkyloxy polyoxyethylene phosphates such as mono-isododecyloxyhexaoxyethylene phosphate, di-isododecyloxyhexaoxyethylene phosphate, mono-isotridecyloxyhexaoxyethylene phosphate, di-isotridecyloxyhexaoxyethylene phosphate, mono-isotetradecyloxyhexaoxyethylene phosphate, and di-isotetradecyloxyhexaoxyethylene phosphate; and salts of an alkali metal (Na, K, and the like) or salts of an alkaline earth metal (Ca, Ba, and the like) thereof.

Moreover, other examples of the compound represented by General Formula (II) include linear alkyloxypolyoxypropylene phosphates such as mono-n-decyloxytetraoxypropylene phosphate, di-n-decyloxytetraoxypropylene phosphate, mono-n-dodecyloxytetraoxypropylene phosphate, di-n-dodecyloxytetraoxypropylene phosphate, mono-n-tetradecyloxytetraoxypropylene phosphate, and di-n-tetradecyloxytetraoxypropylene phosphate; branched alkyl oxypolyoxypropyl ene phosphates such as mono-isodecyloxytetraoxypropylene phosphate, di-isodecyloxytetraoxypropylene phosphate, mono-isododecyloxytetraoxypropylene phosphate, di-isododecyloxytetraoxypropylene phosphate, mono-isotetradecyloxytetraoxypropylene phosphate, and di-isotetradecyloxytetraoxypropylene phosphate; and salts of an alkali metal (Na, K, and the like) or salts of an alkaline earth metal (Ca, Ba, and the like) thereof.

These polyoxyethylene alkyl ether phosphoric esters may be used alone or as a mixture of two or more kinds thereof.

In addition, a nonionic surfactant such as alkyl polyoxyethyleneoxyethanol may be used in combination therewith.

From the viewpoint of securing stability during polymerization, the metal salt of the phosphoric acid-based compound (for example, an alkyl phosphate and an alkylaryl phosphate) is preferably a polyoxyalkylene alkyl phenyl ether phosphate or a polyoxyalkylene alkyl ether phosphate, more preferably a polyoxyethylene alkyl phenyl ether phosphate or a polyoxyethylene alkyl ether phosphate, and still more preferably the polyoxyethylene alkyl ether phosphate.

The alkyl group of the polyoxyethylene alkyl ether phosphate has, for example, 1 to 20 carbon atoms, preferably 5 to 18 carbon atoms, more preferably 7 to 16 carbon atoms, and still more preferably 10 to 16 carbon atoms.

The number of the oxyethylene units in the polyoxyethylene alkyl ether phosphate is, for example, 2 to 14, preferably 2 to 10, more preferably 2 to 8, and still more preferably 2 to 6.

These emulsifiers do not easily deteriorate a polyester resin or a polycarbonate resin, and can be removed to a certain extent from the rubber-containing graft polymer by further washing with water or a solvent.

The rubber-containing graft polymer in a latex state obtained by emulsion polymerization can be obtained as a powder by coagulation, washing, and then drying, or by spray recovery.

In a case of recovery by coagulation, examples of a coagulant include various inorganic or organic acids and salts thereof such as, for example, sulfuric acid, nitric acid, hydrochloric acid, phosphoric acid, phosphorous acid, acetic acid, aluminum sulfate, magnesium sulfate, sodium sulfate, sodium nitrate, aluminum chloride, calcium chloride, sodium chloride, calcium acetate, and sodium acetate.

Among these, the calcium acetate is preferable since the alkaline earth metal remaining in the rubber-containing graft polymer can be reduced.

The coagulants may be used alone or in combination of two or more kinds thereof.

From the viewpoint of ensuring good thermal stability while not deteriorating a polycarbonate resin or a polyester resin, the content of the alkaline earth metal in the rubber-containing graft polymer of the present invention is preferably 2,000 ppm (by mass) or less, more preferably 1,000 ppm (by mass) or less, and still more preferably 500 ppm (by mass) or less.

In a case where the content of the alkaline earth metal in the rubber-containing graft polymer is within the range, the thermal stability, the color tone, and the wet heat aging resistance of a rubber-containing graft polymer are good.

The phosphorus content of the rubber-containing graft polymer of the present invention is 3 to 30 mmol/kg, and preferably 5 to 25 mmol/kg.

In a case where the phosphorus content in the rubber-containing graft polymer is within the range, the wet heat aging resistance of a shaped article obtained by shaping a resin composition containing the rubber-containing graft polymer, which is formed of the rubber-containing graft polymer and a thermoplastic resin, becomes better.

The sodium content in the rubber-containing graft polymer of the present invention is preferably 30 ppm (by mass) or less, more preferably 10 ppm or less, and still more preferably 5 ppm or less, in order to ensure good thermal stability.

(Thermoplastic Resin (B))

The resin composition containing the rubber-containing graft polymer of the present invention includes the rubber-containing graft polymer of the present invention and a thermoplastic resin (B).

Since a resin modifier having methyl methacrylate as a main component is frequently used in many thermoplastic resins including a polyester, an aromatic polycarbonate, olefin resins such as a styrene-based resin, a vinyl chloride resin, and polyethylene, the rubber-containing graft polymer (A) having a graft chain having methyl methacrylate as a main component of the present invention can be suitably used. Thus, the thermoplastic resin is not particularly limited and can be applied to various kinds of thermoplastic resins such as an engineering plastic, a styrene-based resin, a polyester, an olefin-based resin, a thermoplastic elastomer, a biodegradable polymer, a halogen-based polymer, and an acrylic resin.

The engineering plastic is not particularly limited as long as it is one of various known thermoplastic engineering plastics, and examples thereof include polyphenylene ether; polycarbonate; polyester-type polymers such as polyethylene terephthalate and polybutylene terephthalate; syndiotactic polystyrene; nylon-type polymers such as 6-nylon and 6,6-nylon; polyarylates; polyphenylene sulfide; polyether ketone; polyether ether ketone; polysulfone; polyether sulfone; polyamide imide; polyether imide; and polyacetal.

In addition, special styrene-based resins such as heat-resistant ABS which has highly excellent heat resistance and requires melt fluidity, heat-resistant acrylic resins, and the like can be exemplified as the engineering plastic in the present invention.

Among these, the aromatic polycarbonate, the polyester, and the styrene-based resin are more preferable.

The aromatic polycarbonate is not particularly limited as long as it is a polymer compound having a carbonate ester bond (—O—C(O)—O—) in the main chain. Examples thereof include 4,4'-dioxydiarylalkane-based polycarbonates such as 2,2-bis(4-hydroxyphenyl)propane-based polycarbonate (bisphenol A-based polycarbonate).

Examples of the olefin-based resin include high-density polyethylene, medium-density polyethylene, low-density polyethylene, and a copolymer of ethylene and another α-olefin; polypropylene and a copolymer of propylene and anther α-olefin; and polybutene and poly-4-methylpentene-1.

Examples of the thermoplastic elastomer include styrene-based elastomers such as a styrene-butadiene-styrene copolymer (SBS), a styrene-isoprene-styrene copolymer (SIS), a styrene-ethylene/butene copolymer (SEB), a styrene-ethylene/propylene copolymer (SEP), a styrene-ethylene/butene-styrene copolymer (SEBS), a styrene-ethylene/propylene-styrene copolymer (SEPS), a styrene-ethylene/ethylene/propylene-styrene copolymer (SEEPS), a styrene-butadiene/butylene-styrene copolymer (a partially hydrogenated product of a styrene-butadiene-styrene copolymer: SBBS), a partially hydrogenated product of a styrene-isoprene-styrene copolymer, and a partially hydrogenated product of a styrene-isoprene/butadiene-styrene copolymer; urethane-based elastomers produced by a reaction of a polymer diol (polyester diol, polyether diol, polyester ether diol, polycarbonate diol, polyester polycarbonate diol, or the like), an organic diisocyanate (examples of the organic diisocyanates include 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexylmethane diisocyanate), isophorone diisocyanate, and hexamethylene diisocyanate, and among these organic diisocyanates, 4,4'-diphenylmethane diisocyanate), and a chain extender (ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol, 1,4-bis(β-hydroxyethoxy)benzene, or the like); polyolefin-based elastomers such as an ethylene-propylene rubber, an ethylene-propylene-diene rubber, an ethylene-vinyl acetate copolymer, a butyl rubber, a butadiene rubber, a propylene-butene copolymer, and an ethylene-acrylic ester copolymer; polyamide-based elastomers; fluorine-based elastomers; chlorinated PE-based elastomers; and acrylic elastomers.

Examples of the styrene-based resin include a polystyrene, an acrylonitrile-styrene copolymer, an acrylonitrile-styrene-α-methylstyrene copolymer, an acrylonitrile-methyl methacrylate-styrene-α-methylstyrene copolymer, an ABS resin, an AS resin, an MABS resin, an MBS resin, an AAS resin, an AES resin, an acrylonitrile-butadiene-styrene-α-methylstyrene copolymer, an acrylonitrile-methyl methacrylate-butadiene-styrene-α-methylstyrene copolymer, a styrene-maleic anhydride copolymer, a styrene-maleimide copolymer, a styrene-N-substituted maleimide copolymer, an acrylonitrile-styrene-N-substituted maleimide copolymer, an acrylonitrile-butadiene-styrene-β-isopropenyl naphthalene copolymer, and an acrylonitrile-methyl methacrylate-butadiene-styrene-α-methylstyrene-maleimide copolymer.

These may be contained alone or in combination of two or more kinds thereof.

The polyester is a polymer composed of a polybasic acid and a polyhydric alcohol, and is not particularly limited as long as it has thermoplasticity.

Examples of the polybasic acid include terephthalic acid, naphthaldicarboxylic acid, cyclohexyldicarboxylic acid, and esters thereof, and examples of the polyhydric alcohol include ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxyphenyl)propane, 1,4-dimethylol tetrabromobenzene, and TBA-EO.

The polyester-based resin may be a homopolymer, a copolymer, or a blend of two or more kinds thereof. In addition, a trade name "PETG" manufactured by Eastman Chemical Company is also suitably used.

Examples of the biodegradable polymer include microbial polymers such as biopolyesters (PHB/V and the like), bacterial celluloses, and microbial polysaccharides (pullulan, curdlan, and the like); chemically synthesized polymers such as aliphatic polyesters (polycaprolactone, polybutylene succinate, polyethylene succinate, polyglycolic acid, polylactic acid, and the like), polyvinyl alcohols, and polyamino acids (PMLG and the like); and natural product-based polymers such as chitosan/cellulose, starch, and cellulose acetate.

Examples of the halogenated polymer include a homopolymer of vinyl chloride, a copolymer containing 80% by mass or more of vinyl chloride, and a highly chlorinated polyvinyl chloride.

Examples of the components of the copolymer include monovinyl compounds such as ethylene, vinyl acetate, methyl methacrylate, and butyl acrylate, in addition to vinyl chloride.

These monovinyl compounds may be contained in a total amount of 20% by mass or less with respect to 100% by mass of the copolymer.

The homopolymers and the copolymers may be contained alone or in combination of two or more kinds thereof.

In addition, a fluorinated polymer, a brominated polymer, an iodinated polymer and the like are also included.

Examples of the acrylic resin include a copolymer obtained by polymerizing vinyl monomers which are copolymerizable with methyl methacrylate.

Examples of the vinyl monomers which are copolymerizable with methyl methacrylate include alkyl acrylates such as methyl acrylate, ethyl acrylate, i-propyl acrylate, n-butyl acrylate, and 2-ethylhexyl acrylate; alkyl methacrylates such as ethyl methacrylate, propyl methacrylate, and n-butyl methacrylate; and aromatic vinyl compounds such as styrene, α-methylstyrene, and vinyl toluene.

Polymer alloys of engineering plastics such as polyphenylene ether; polycarbonate; polyester-based resins such as polyethylene terephthalate and polybutylene terephthalate, syndiotactic polystyrene; polyamide-based resins such as 6-nylon and 6,6-nylon; polyarylate; polyphenylene sulfide; polyether ketone; polyether ether ketone; polysulfone; polyethersulfone; polyamideimide; polyetherimide; and polyacetal with the above-described thermoplastic resins are also included in the scope of the present invention.

The resin composition of the present invention may contain, in addition to the above-described materials, various known additives such as, for example, a stabilizer, a flame retardant, a flame retardant aid, a hydrolysis inhibitor, an antistatic agent, a foaming agent, a dye, and a pigment within a range not impairing the purpose of the present invention.

A method of blending the respective materials in the production of the resin composition of the present invention include known methods, but are not particularly limited thereto. Examples thereof include a method of mixing and kneading with a tumbler, a V-type blender, a super mixer, a Nauter mixer, a Banbury mixer, a kneading roll, an extruder, or the like.

EXAMPLES

Hereinafter, the present invention will be described in more detail with reference to Production Examples and Examples. Production Examples 1 to 13 are Production Examples of a rubber-like polymer, a rubber-containing graft polymer (A), and the like. Further, "parts" means "parts by mass", "%" means "% by mass", and the particle diameter means a volume-average particle diameter (Dv). In addition, the following measurements and tests were performed as follows.

[Measurement of Molecular Weight of Organic Solvent-Soluble Fraction of Rubber-Containing Graft Polymer]

Hereinafter, the molecular weight of the organic solvent-soluble fraction is measured by the following procedures of [1] and [2].

[1] Preparation of Dried Sample

A mixture formed of 1% by mass of a rubber-containing graft polymer and 99% by mass of acetone is prepared and subjected to the following operations (1) to (4) to obtain a "dry sample".

(1) The mixture is subjected to an centrifuge operation at 14,000 rpm for 300 minutes.

(2) The supernatant is extracted and put into a flask.

(3) The flask is set in a thermostat bath at a temperature of 56° C. and volatile components are distilled off by an evaporator.

(4) The residue in the flask is dried at 120° C. for 3 hours to obtain a "dry sample". The "dry sample" is an organic solvent-soluble fraction.

[2] Measurement of Molecular Weight (1) The organic solvent-soluble fraction collected in [1] is dissolved in tetrahydrofuran (THF). (Sample concentration: 0.2% to 0.3% by Mass)

(2) A molecular weight distribution (which can be calculated from the weight-average molecular weight (Mw) and the number-average molecular weight (Mn)) is measured using gel permeation chromatography (GPC). The measurement was carried out using polystyrene as a standard polymer used for a calibration curve, THF as an eluent, a TSK-GEL columns manufactured by Tosoh Corporation, and a differential refractive index detector for detection.

[Residual Element Analysis of Rubber-Containing Graft Polymer]

0.25 g of powder containing a graft copolymer is weighed into a decomposition vessel, 8 ml of nitric acid is added thereto, and the mixture is decomposed with a microwave (wet type decomposition). After cooling, 2 ml of hydrofluoric acid is added thereto, and the mixture is treated again with the microwave and then diluted to 50 ml with distilled water to obtain a test solution. The contents of phosphorus, sodium, potassium, calcium, magnesium, and sulfur in the test solution are quantified using an ICP emission spectrometer (IRIS Interpid II XSP: manufactured by Thermo Fisher Scientific Inc.).

[Measurement of Particle Diameter]

The measurement was performed using a nanoparticle size distribution measuring device, SALD-7100 (manufactured by Shimadzu Corporation).

[Measurement of Polymerization Rate]

The polymerization rate of a graft latex is measured by the following procedure.

(i) A mass (x) of an aluminum dish is measured up to a unit of 0.1 mg.

(ii) About 1 g of a latex of a polymer (X) is placed in an aluminum dish, and a mass (y) of the aluminum dish containing the latex of the polymer (X) is measured up to a unit of 0.1 mg.

(iii) The aluminum dish containing the latex of the polymer (X) is placed in a dryer at 180° C. and heated for 45 minutes.

(iv) The aluminum dish is taken out of the dryer and cooled to 25° C. in a desiccator, and a mass (z) thereof is measured up to a unit of 0.1 mg.

(v) A concentration (%) of the solid content of the latex of the polymer (X) is calculated based on the following equation.

$$\text{Concentration (\%) of solid content} = \{(z-x)/(y-x)\} \times 100$$

(vi) A percentage (%) of the concentration of the solid content calculated with respect to the concentration (v) of the solid content at the time of polymerization of all the monomers charged in the production of the polymer (X) is defined as a polymerization rate at the end of the production of the graft latex.

Production Example 1

"Component 1" including water and an emulsifier shown in Table 1 was added into a separable flask equipped with a cooling tube, a thermometer, and a stirrer. The atmosphere in the flask was replaced with nitrogen by passing a nitrogen gas stream through the separable flask, and the temperature of the liquid was raised to 80° C. At a point of time that the temperature of the liquid reached 80° C., seed monomers, "Component 2", shown in Table 1 were mixed and stirred for 5 minutes, and then a polymerization initiator, "Component 3", shown in Table 1 was added thereto to start polymerization (the temperature may sometimes rise by about 10° C. due to polymerization heat). Thereafter, the temperature of the liquid was maintained for 25 minutes while being fixed so as not to fall below 78° C.

Furthermore, rubber-forming monomers, "Component 4", shown in Table 1 were forcibly emulsified and added dropwise to the separable flask over 180 minutes while controlling the temperature of the liquid at 80±2° C. Thereafter, the temperature of the liquid was maintained for 60 minutes while being fixed at 80° C.±2° C. Thus, a latex of the rubber-like polymer was obtained. Subsequently, while the temperature of the liquid of the graft component monomers, "Component 6", shown in Table 1 was controlled at 80±2° C., the liquid was added dropwise thereto over 30 minutes. Thereafter, the temperature of the liquid was maintained for 60 minutes while being fixed at 80° C.±2° C. Thus, a graft latex was obtained. The polymerization rate was 94.0% to 99.5%.

In addition, a trade name "PHOSPHANOL (registered trademark) RS-610NA, manufactured by Toho Chemical Industry Co., Ltd." was used as sodium tridecyloxyhexaoxyethylene phosphate; a trade name "NEOPELEX G-15, manufactured by Kao Corporation" was used as sodium dodecylbenzenesulfonate, and a trade name "PELEX OT-P, manufactured by Kao Corporation" was used as sodium dialkyl sulfosuccinate.

TABLE 1

| | | Production Example 1 | Production Example 2 | Production Example 3 | Production Example 4 | Production Example 5 | Production Example 6 |
|---|---|---|---|---|---|---|---|
| Rubber-containing graft polymer | | A-1 | A-2 | B-1 | B-2 | B-3 | B-4 |
| Component 1 | Deionized water | 160 | 160 | 160 | 160 | 160 | 160 |
| | Sodium tridecyloxyhexaoxyethylene phosphate | 0.02 | 0.45 | — | — | 0.02 | — |
| | Sodium dialkyl sulfosuccinate | — | — | 0.08 | 0.08 | — | 0.80 |
| Component 2 | Methyl methacrylate | 3.15 | 3.15 | 3.15 | 3.15 | 3.15 | 3.15 |
| | n-Butyl acrylate | 1.62 | 1.62 | 1.62 | 1.62 | 1.62 | 1.62 |
| | Allyl methacrylate | 0.02 | 0.02 | 0.02 | 0.02 | 0.02 | 0.02 |
| Component 3 | Potassium peroxodisulfate | 0.05 | 0.05 | 0.05 | 0.05 | 0.05 | 0.05 |
| | Deionized water | 3.00 | 3.00 | 3.00 | 3.00 | 3.00 | 3.00 |
| Component 4 | n-Butyl acrylate | 73.12 | 73.12 | 73.12 | 73.12 | 73.12 | 73.12 |
| | Styrene | 1.00 | 1.00 | 1.00 | 1.00 | 1.00 | 1.00 |
| | Allyl methacrylate | 0.38 | 0.38 | 0.38 | 0.38 | 0.38 | 0.38 |
| | Sodium tridecyloxyhexaoxyethylene phosphate | 0.50 | 0.50 | — | — | 0.50 | — |
| | Sodium dodecylbenzenesulfonate | — | — | 0.38 | 0.38 | — | 0.38 |
| | Deionized water | 24.00 | 24.00 | 24.00 | 24.00 | 24.00 | 24.00 |
| Component 5 | Ferrous sulfate | — | — | 0.001 | — | 0.001 | — |
| | Disodium ethylenediamine tetraacetate | — | — | 0.003 | — | 0.003 | — |
| | Sodium formaldehyde sulfoxylate | — | — | 0.30 | — | 0.30 | — |
| | Deionized water | — | — | 4.17 | — | 4.17 | — |
| Component 6 | Methyl methacrylate | 20.00 | 20.00 | 20.00 | 20.00 | 20.00 | 20.00 |
| | n-Butyl acrylate | — | — | — | — | — | — |
| | t-Butyl hydroperoxide | — | — | 0.04 | — | 0.04 | — |
| | Sodium tridecyloxyhexaoxyethylene phosphate | — | — | — | — | 0.20 | — |
| | Deionized water | — | — | — | — | 6.50 | — |
| Particle diameter [nm] of rubber polymer latex | | 230 | 88 | 230 | 200 | 250 | 92 |

An aqueous solution formed by blending "Component 7" shown in Table 2 was set at a temperature of 40° C.±5° C. and an acryl rubber-based graft latex was introduced into the aqueous solution to form a slurry. The slurry was agglomerated by raising the temperature of the liquid to 70° C.±5 and holding it for 5 minutes. A process of collecting the aggregates, immersing them in 1,500 parts of deionized water, and performing dehydration was repeated twice, and the resultant was dried at a temperature of 65° C.±5 for 12 hours to obtain a rubber-containing graft polymer (A-1) powder.

TABLE 2

| | Material | Parts |
|---|---|---|
| Component 7 | Deionized water | 500 |
| | Calcium acetate | 5 |

Production Examples 2 to 6

Powders of rubber-containing graft polymers (A-2) and (B-1) to (B-4) were obtained in the same manner as in Production Example 1, except that the respective components shown in Table 1 were changed. It should be noted that B-3 was added dropwise after "Component 6" was forcibly emulsified. In addition, for B-1 and B-3, "Component 5" was added immediately before adding "Component 6" dropwise, the mixture was heated and stirred for 30 minutes, and then dropwise addition of "Component 6" was initiated. The polymerization rates of the rubber latex and the graft latex were each 95% or more.

Production Example 7

(1) Production of Diene-Based Rubber-Like Polymer Latex (R-1)

"Component 1" shown in Table 3 as a first monomer mixed liquid was charged into an autoclave having a capacity of 70 L, the temperature was raised, at a point of time that the temperature of the liquid reached 50° C., a redox initiator of "Component 2" shown in Table 3 was added thereto to initiate a reaction, and then the temperature of the liquid was further raised to 60° C. Thereafter, a polymerization initiator of "Component 3" shown in Table 3 was added in two divided portions 3 hours and 4 hours after the initiation of the polymerization, and an emulsifier of "Component 4" shown in Table 3, a second monomer mixed liquid of "Component 5" shown in Table 3, and a polymerization initiator of "Component 6" shown in Table 3 were continuously added dropwise into the autoclave over 8 hours. Then, the temperature of the liquid was raised to 80° C. and "Component 7" shown in Table 3 was added thereto to perform a reaction for 15 hours, thereby obtaining a latex (R-1) of the rubber-like polymer having a conversion of 98% or more.

In addition, a trade name "NEOPELEX G-15, manufactured by Kao Corporation" was used as sodium dodecylbenzenesulfonate, and a trade name "PHOSPHANOL (registered trademark) RD-510Y manufactured by Toho Chemical Industry Co., Ltd." was used as sodium polyoxyethylene (4) alkyl ether phosphate.

TABLE 3

| | Material | Parts |
|---|---|---|
| Component 1 | 1,3-Butadiene | 19 |
| | Styrene | 1 |
| | t-Dodecyl mercaptan | 0.1 |
| | Isopropylbenzene hydroperoxide | 0.3 |
| | Sodium dodecylbenzenesulfonate | 0.08 |
| | Sodium hydroxide | 0.01 |
| | Deionized water | 272 |
| Component 2 | Ferrous sulfate | 0.001 |
| | Disodium ethylenediaminetetraacetate | 0.008 |
| | Sodium formaldehyde sulfoxylate | 0.05 |
| | Deionized water | 5 |
| Component 3 | Isopropylbenzene hydroperoxide | 0.1 |
| | Deionized water | 2.7 |
| Component 4 | Polyoxyethylene (4) sodium alkyl ether phosphate | 0.8 |
| Component 5 | 1,3-Butadiene | 80 |
| | t-Dodecyl mercaptan | 0.4 |
| | Deionized water | 4 |
| Component 6 | Isopropylbenzene hydroperoxide | 0.36 |
| | Deionized water | 4 |
| Component 7 | Isopropyl benzene hydroperoxide | 0.06 |
| | Deionized water | 1.4 |

(2) Production of Graft Polymer (A-3) of Rubber-Containing Graft Polymer 240 parts of a latex (R-1) (60 parts as a monomer component to be charged) was charged into a reaction vessel equipped with a stirrer and a reflux cooling tube, the atmosphere in a flask was replaced with nitrogen by passing a nitrogen gas stream therethrough, and the temperature was raised to 80° C. Next, "Component 1" shown in Table 4 was added thereto. Then, a mixture of "Component 2" shown in Table 4 was forcibly emulsified and added dropwise into the reaction vessel over 90 minutes, and then heating and stirring were continued for 60 minutes. In addition, an aqueous solution formed from "Component 3" shown in Table 4 was added thereto, the mixture was heated and stirred for 30 minutes, then the monomers of "Component 4" shown in Table 4 were added dropwise into the reaction vessel over 60 minutes, and heating and stirring were continued for 90 minutes. Thus, vinyl monomers were graft-polymerized to the rubber-like polymer to obtain a latex of the rubber-containing graft polymer. The polymerization rate was 98.5%. A volume-average particle diameter (Dv) of the polymer particles in this latex was 170 nm.

Further, "PHOSPHANOL (registered trademark) RS-610, manufactured by Toho Chemical Industry Co., Ltd." was used as the tridecyloxyhexaoxyethylene phosphate.

TABLE 4

| | | Production Example 7 A-3 | Production Example 8 A-4 |
|---|---|---|---|
| | Material | Parts | Parts |
| | Diene-based rubber polymer latex (R-1) | 240 | 300 |
| Component 1 | Potassium peroxodisulfate | 0.1 | 0.01 |
| | Deionized water | 6 | 6 |

TABLE 4-continued

|  | Material | Production Example 7 A-3 Parts | Production Example 8 A-4 Parts |
|---|---|---|---|
| Component 2 | n-Butyl acrylate | 20 | — |
|  | Tridecyloxyhexaoxyethylene phosphate | 0.13 | — |
|  | Deionized water | 13 | — |
| Component 3 | Potassium peroxodisulfate | 0.01 | — |
|  | Deionized water | 6 | — |
| Component 4 | Methyl methacrylate | 20 | 25 |

0.25 parts by mass of Irg 1076 (n-octadecyl-3-(3',5'-di-tert-butyl-4'-hydroxyphenyl)propionate) of a phenol-based antioxidant and 0.75 parts by mass of AO-412S (2,2-bis[[3-(dodecylthio)-1-oxopropyloxy]methyl]-1,3-(propanediyl) bis[3-(dodecylthio)propionate] as a thioether-based antioxidant were added to the obtained rubber-containing graft polymer latex. Subsequently, the mixture was added to 460 parts by mass of deionized water containing 5 parts by mass of calcium acetate to coagulate the polymer, and the resultant was washed with water, dehydrated, and dried to obtain a rubbery graft polymer (A-3).

Production Example 8

A powder of a rubber-containing graft polymer (A-4) was obtained in the same manner as in Production Example 7, except that the respective components shown in Table 4 were changed. The polymerization rate of the rubber-containing graft polymer latex was 94.1%.

Production Example 9

(1) Production of Latex (R-2) of Diene-Based Rubber-like Polymer

"Component 1" shown in Table 5 as a first monomer mixed liquid was charged into an autoclave having a capacity of 70 L, the temperature was raised, and at a point of time that the temperature of the liquid reached 43° C., a redox initiator of "Component 2" shown in Table 5 was added thereto. Thereafter, the temperature of the liquid was further raised to 65° C., and the mixture was reacted for 10 hours to obtain a latex (R-2) of the rubber-like polymer. A volume-average particle diameter (Dv) of the polymer particles in this latex was 86 nm.

Further, "PHOSPHANOL (registered trademark) RD-510Y, manufactured by Toho Chemical Industry Co., Ltd." was used as the sodium polyoxyethylene (4) alkyl ether phosphate.

TABLE 5

|  | Material | Parts |
|---|---|---|
| Component 1 | 1,3-Butadiene | 100 |
|  | Isopropylbenzene hydroperoxide | 0.3 |
|  | Sodium polyoxyethylene (4) alkyl ether phosphate | 0.5 |
|  | Deionized water | 50 |
| Component 2 | Ferrous sulfate | 0.001 |
|  | Disodium ethylenediaminetetraacetate | 0.008 |
|  | Sodium formaldehyde sulfoxylate | 0.05 |
|  | Deionized water | 5 |

(2) Production of Graft Polymer (A-5) of Rubber-Containing Graft Polymer 240 parts of a latex (R-2) (60 parts as a monomer component to be charged) was charged into a reaction vessel equipped with a stirrer and a reflux cooling tube, the atmosphere in a flask was replaced with nitrogen by passing a nitrogen gas stream therethrough, and the temperature was raised to 80° C. Next, "Component 1" shown in Table 6 was added thereto. Then, a mixture of "Component 2" shown in Table 6 was forcibly emulsified and added dropwise into the reaction vessel over 90 minutes, and then heating and stirring were continued for 60 minutes. Further, the monomers of "Component 4" shown in Table 6 were added dropwise into the reaction vessel over 60 minutes, and then heating and stirring were continued for 90 minutes. Thus, vinyl monomers were graft-polymerized to the rubber-like polymer to obtain a latex of the rubber-containing graft polymer. The polymerization rate was 100%.

Further, "PHOSPHANOL (registered trademark) RS-610, manufactured by Toho Chemical Industry Co., Ltd." was used as the tridecyloxyhexaoxyethylene phosphate.

TABLE 6

|  | Material | Production Example 9 A-5 parts |
|---|---|---|
|  | Diene-based rubber polymer latex (R-2) | 300 |
| Component 1 | Potassium peroxodisulfate | 0.1 |
|  | Deionized water | 6 |
| Component 2 | n-Butyl acrylate | 20 |
|  | Tridecyloxyhexaoxyethylene phosphate | 0.13 |
|  | Deionized water | 13 |
| Component 3 | Methyl methacrylate | 20 |

0.25 parts by mass of Irg 1076 (n-octadecyl-3-(3',5'-di-tert-butyl-4'-hydroxyphenyl)propionate) of a phenol-based antioxidant and 0.75 parts by mass of AO-412S (2,2-bis[[3-(dodecylthio)-1-oxopropyloxy]methyl]-1,3-(propanediyl) bis[3-(dodecylthio)propionate] as a thioether-based antioxidant were added to the obtained rubber-containing graft polymer latex. subsequently, the mixture was added to 460 parts by mass of deionized water containing 5 parts by mass of calcium acetate to coagulate the polymer, and the resultant was washed with water, dehydrated, and dried to obtain a rubbery graft polymer (A-5).

Production Example 10

(1) Production of Latex (R-3) of Diene-Based Rubber-Like Polymer

"Component 1" shown in Table 7 as a first monomer mixed liquid was charged into an autoclave having a capacity of 70 L, the temperature was raised, at a point of time that the temperature of the liquid reached 43° C., a redox initiator of "Component 2" shown in Table 7 was added thereto to initiate a reaction, and then the temperature of the liquid was further raised to 65° C. Three hours after the initiation of the polymerization, a polymerization initiator of "Component 3" shown in Table 7 was added to the mixture, and one hour after that, a second monomer mixed liquid of "Component 4" shown in Table 7, an aqueous emulsifier solution of "Component 5" shown in Table 7, and a polymerization initiator of "Component 6" shown in Table 7 were continuously added dropwise into the autoclave over 8 hours. The reaction was carried out for 4 hours from the initiation of the polymerization to obtain a latex (R-3) of the rubber-like polymer. A volume-average particle diameter (Dv) of the polymer particles in this latex was 180 nm.

In addition, a trade name "PELEX SS-L, manufactured by Kao Corporation" was used as the sodium alkyldiphenyl ether disulfonate.

TABLE 7

| | Material | Parts |
|---|---|---|
| Component 1 | 1,3-Butadiene | 19 |
| | Styrene | 1 |
| | t-Dodecyl mercaptan | 0.1 |
| | Isopropylbenzene hydroperoxide | 0.3 |
| | Sodium formaldehyde sulfoxylate | 0.2 |
| | Sodium alkyl diphenyl ether disulfonate (SS-L) | 0.1 |
| | Potassium hydroxide | 0.01 |
| | Deionized water | 146 |
| Component 2 | Ferrous sulfate | 0.0005 |
| | Disodium ethylenediaminetetraacetate | 0.0015 |
| | Deionized water | 4 |
| Component 3 | Isopropylbenzene hydroperoxide | 0.1 |
| Component 4 | 1,3-Butadiene | 76 |
| | Styrene | 4 |
| | t-Dodecyl mercaptan | 0.4 |
| Component 5 | sodium alkyl diphenyl ether disulfonate (SS-L) | 1.3 |
| | Sodium formaldehyde sulfoxylate | 0.4 |
| | Deionized water | 29 |
| Component 6 | Isopropylbenzene hydroperoxide | 0.6 |

(2) Production of Graft Polymer (B-5) of Rubber-Containing Graft Polymer 219 parts of a latex (R-3) (75 parts as a monomer component to be charged) was charged into a reaction vessel equipped with a stirrer and a reflux cooling tube, the atmosphere in a flask was replaced with nitrogen by passing a nitrogen gas stream therethrough, and "Component 1" shown in Table 8 was added thereto. Next, the temperature of the liquid in the reaction vessel was raised to 80° C., an aqueous solution formed from "Component 2" shown in Table 8 was added thereto, subsequently, the mixture of "Component 3" shown in Table 8 was added dropwise to the reaction vessel over 60 minutes, and heating and stirring were continued for 60 minutes. Thus, vinyl monomers were graft-polymerized to the rubber-like polymer to obtain a latex of the rubber-containing graft polymer. The polymerization rate was 100%.

TABLE 8

| | | Production Example 10 B-5 | Production Example 11 B-6 |
|---|---|---|---|
| | Material | Parts | |
| | Diene-based rubber polymer latex (R-3) | 219 | 222 |
| | Deionized water | — | 153 |
| Component 1 | Sodium formaldehyde sulfoxylate | 0.05 | 0.06 |
| | Deionized water | 4 | 5 |
| Component 2 | Methyl methacrylate | 25 | 20 |
| | t-Butyl hydroperoxide | 0.04 | 0.08 |

8.3 parts by mass of Irg 1076 (n-octadecyl-3-(3',5'-di-tert-butyl-4'-hydroxyphenyl)propionate) of a phenol-based antioxidant was added to the obtained rubber-containing graft polymer latex. Subsequently, the mixture was added to 625 parts by mass of deionized water containing 5 parts by mass of calcium acetate to coagulate the polymer, and the resultant was washed with water, dehydrated, and dried to obtain a powder of a rubbery graft polymer (B-5).

Production Example 11

A powder of a rubber-containing graft polymer (B-6) was obtained in the same manner as in Production Example 10, except that the components shown in Table 8 were changed. The polymerization rate was 100%.

Production Example 12

(1) Production of Latex (S-1) of Polyorganosiloxane Rubber 97.5 parts of a cyclic organosiloxane mixture (manufactured by Shin-Etsu Silicone Co., Ltd., trade name: DMC), 2 parts of tetraethoxysilane (TEOS), and 0.5 parts of γ-methacryloyloxypropyldimethoxymethylsilane (DSMA) were mixed to obtain 100 parts of an organosiloxane mixture. An aqueous solution obtained by dissolving 0.68 parts of sodium dodecylbenzenesulfonate (DBSNa) and 0.68 parts of dodecylbenzenesulfonic acid (DBSH) in 200 parts of deionized water was added to the mixture, and the mixture was stirred at 10,000 rpm for 2 minutes with a homomixer and passed through a homogenizer twice at a pressure of 20 MPa to obtain a stable premixed emulsion.

Next, the emulsion was charged into a separable flask having a capacity of 5 liters, equipped with a cooling condenser. The emulsion was heated to 85° C. and maintained for 6 hours to perform a polymerization reaction, then cooled to 25° C., and maintained at 25° C. for 12 hours. Thereafter, the reaction solution was neutralized to pH 7.0 by the addition of a 5% aqueous solution of sodium hydroxide to obtain a latex (S-1) of the polyorganosiloxane rubber.

The solid content of this latex was 40%. In addition, the latex had a number-average particle diameter (Dn) of 170 nm, a volume-average particle diameter (Dv) of 210 nm, and Dv/Dn of 1.24.

(2) Production of Polyorganosiloxane Composite Rubber (S-2) and Rubber-Containing Graft Polymer (A-6)

14.5 parts (5 parts as a monomer component to be charged) of the polyorganosiloxane rubber latex (S-1) was collected in a separable flask having a capacity of 5 liters. Next, a mixture of 100 parts of deionized water, 0.6 parts of sodium tridecyloxyhexaoxyethylene phosphate (trade name "PHOSPHANOL RS-610NA, manufactured by Toho Chemical Industry Co., Ltd."), 55.4 parts of n-butyl acrylate (n-BA), 0.3 parts of allyl methacrylate (AMA), and 0.05 parts of potassium peroxodisulfate (KPS) was added into the separable flask. The atmosphere in the flask was replaced with nitrogen by passing a nitrogen gas stream through the separable flask, and the temperature of the liquid was raised to 60° C. to initiate radical polymerization. In order to complete the polymerization of the acrylate component, the temperature of the liquid was maintained at 60° C. for 1 hour to obtain a latex (S-2) of a composite rubber of polyorganosiloxane and n-BA.

Subsequently, the temperature of the liquid was raised to 80° C., a mixed liquid of 27.7 parts of n-BA and 0.2 parts of AMA was added dropwise into this latex over 45 minutes, and then the mixture was heated and stirred at 60° C. for 1 hour. Further, a mixed liquid of 10.5 parts of methyl methacrylate (MMA) and 0.5 parts of n-BA was added dropwise into the latex over 20 minutes to perform polymerization.

After completion of the dropwise addition, the mixture was maintained at a temperature of the liquid of 60° C. for 1 hour and then cooled to 25° C. to obtain a latex of the rubber-containing graft polymer (A-6).

0.6 parts of sodium tridecyloxyhexaoxyethylene phosphate (trade name "PHOSPHANOL (registered trademark) RS-610NA, manufactured by Toho Chemical Industry Co., Ltd.)" was added to the obtained latex of the rubber-containing graft polymer (A-6). Subsequently, the mixture was added to 300 parts by mass of deionized water containing 5 parts by mass of calcium acetate to coagulate the polymer, and the resultant was washed with water, dehydrated, and dried to obtain a powder of a rubbery graft polymer (A-6).

Production Example 13

14.5 parts (5 parts as a monomer component to be charged) of the polyorganosiloxane rubber latex (S-1) produced in the same manner as in Production Example 12 was collected in a separable flask having a capacity of 5 liters, and 100 parts of deionized water and 3.3 parts of sodium dodecylbenzenesulfonate (trade name "NEOPELEX G-15, manufactured by Kao Corporation") were added thereto and mixed. Next, a mixture of 55.4 parts of n-butyl acrylate (n-BA), 0.6 parts of allyl methacrylate (AMA), and 0.2 parts of tert-butyl hydroperoxide (t-BH) was added into the separable flask.

The atmosphere in the flask was replaced with nitrogen by passing a nitrogen stream through the separable flask, and the temperature of the liquid was raised to 50° C. At a point of time that the temperature reached 50° C., an aqueous solution obtained by dissolving 0.001 parts of ferrous sulfate (Fe), 0.003 parts of disodium ethylenediamine tetraacetate (EDTA), and 0.3 parts of sodium formaldehyde sulfoxylate (SFS) in 4.7 parts of deionized water was added thereto to initiate radical polymerization. In order to complete the polymerization of the acrylate component, the temperature of the liquid was maintained at 65° C. for 1 hour to obtain a latex (S-3) of a composite rubber of polyorganosiloxane and n-BA.

While the temperature of the latex (S-3) of the composite rubber was maintained at 65° C., a mixed liquid of 27.7 parts of n-BA, 0.3 parts of AMA, and 0.1 parts of t-BH was added dropwise into this latex over 45 minutes, and then the mixture was heated and stirred for 1 hour. Next, a mixed liquid of 10.5 parts of methyl methacrylate (MMA), 0.5 parts of n-BA, and 0.06 parts of t-BH was added dropwise into the latex over 20 minutes to perform polymerization. After completion of the dropwise addition, the temperature of the liquid was maintained at 65° C. for 1 hour, and then cooled to 25° C. to obtain a latex of the rubber-containing graft polymer (B-7).

Subsequently, the latex of the obtained rubber-containing graft polymer (B-7) was added to 300 parts by mass of deionized water containing 5 parts by mass of calcium acetate to coagulate the polymer, and the resultant was washed with water, dehydrated, and dried to obtain a powder of a rubbery graft polymer (B-7).

Example 1 and Comparative Examples 1 to 3

The rubber-containing graft polymer (A-1) obtained in Production Example 1 and a polybutylene terephthalate resin ("NOVADURAN (registered trademark) 5010 R5" (trade name), manufactured by Mitsubishi Engineering-Plastics Corporation) were blended and mixed at the composition shown in Table 9 to obtain a mixture. This mixture was supplied to a devolatilizing twin-screw extruder (PCM-30 manufactured by Ikegai Iron Works, Ltd.) which had been heated to a barrel temperature of 260° C., and kneaded to prepare a pellet of the resin composition of Example 1, having 15% by mass of the rubber-containing graft polymer (A-1) blended therein.

A pellet of each of resin compositions of Comparative Examples 1 to 3 was prepared in the same manner as in Example 1, except that the type and/or the use amount of the rubber-containing graft polymer and the blend amount of the polybutylene terephthalate resin were changed to the conditions shown in Table 9.

TABLE 9

|  | Example 1 | Comparative Example 1 | Comparative Example 2 | Comparative Example 3 |
|---|---|---|---|---|
| PBT | 85 | 85 | 85 | 85 |
| A-1 | 15 |  |  |  |
| B-1 |  | 15 |  |  |
| B-2 |  |  | 15 |  |
| B-3 |  |  |  | 15 |

Furthermore, the symbols in the table have the following meanings.
PBT: Polybutylene terephthalate resin ("NOVADURAN (registered trademark) 5010 R5")

Examples 2 to 6 and Comparative Examples 4 to 9

The rubber-containing graft polymer (A-1) obtained in Production Example 1, a polybutylene terephthalate resin ("NOVADURAN (registered trademark) 5010 R5" (trade name), manufactured by Mitsubishi Engineering-Plastics Corporation), and an aromatic polycarbonate ("IUPILON (registered trademark) S-2000F" (trade name), manufactured by Mitsubishi Engineering-Plastics Corporation, a nominal aromatic polycarbonate resin Mv: 22,000) were blended at the composition shown in Table 10 and mixed to obtain a mixture. This mixture was supplied to a devolatilizing twin-screw extruder (PCM-30 manufactured by Ikegai Iron Works Co., Ltd.) heated to a barrel temperature of 260° C. and kneaded to prepare a pellet of the resin composition of Example 2 which was an alloy of a polybutylene terephthalate resin and an aromatic polycarbonate, having 10% by mass of the rubber-containing graft polymer (A-1) blended therein.

A pellet of each of resin compositions of Examples 3 to 6 and Comparative Examples 4 to 9 was prepared in the same manner as in Example 2, except that the type and/or the use amount of the rubber-containing graft polymer and the blend amount of the other raw materials were changed to the conditions shown in Table 10.

TABLE 10

|  | Example | | | | | Comparative Example | | | | | |
|---|---|---|---|---|---|---|---|---|---|---|---|
|  | 2 | 3 | 4 | 5 | 6 | 4 | 5 | 6 | 7 | 8 | 9 |
| PBT | 36 | 36 | 36 | 36 | 36 | 36 | 36 | 36 | 36 | 36 | 36 |
| PC | 54 | 54 | 54 | 54 | 54 | 54 | 54 | 54 | 54 | 54 | 54 |
| A-1 | 10 |  |  |  |  |  |  |  |  |  |  |
| A-2 |  | 10 |  |  |  |  |  |  |  |  |  |
| A-3 |  |  | 10 |  |  |  |  |  |  |  |  |
| A-5 |  |  |  | 10 |  |  |  |  |  |  |  |
| A-6 |  |  |  |  | 10 |  |  |  |  |  |  |
| B-1 |  |  |  |  |  | 10 |  |  |  |  |  |
| B-2 |  |  |  |  |  |  | 10 |  |  |  |  |
| B-3 |  |  |  |  |  |  |  | 10 |  |  |  |
| B-4 |  |  |  |  |  |  |  |  | 10 |  |  |
| B-5 |  |  |  |  |  |  |  |  |  | 10 |  |
| B-7 |  |  |  |  |  |  |  |  |  |  | 10 |

Furthermore, the symbols in the table have the following meanings.
PBT: Polybutylene terephthalate resin ("NOVADURAN (registered trademark) 5010 R5")
PC: Aromatic polycarbonate resin ("IUPILON (registered trademark) S-2000F")

Example 7 and Comparative Examples 10 and 11

The rubber-containing graft polymer (A-4) obtained in Production Example 8, "AP-H" (trade name, manufactured by Techno-UMG Co., Ltd., a nominal AN ratio of about 26%, Mw of about 110,000) as a styrene acrylonitrile resin (SAN), and "IUPILON (registered trademark)S-2000F" (trade name, My of a nominal aromatic polycarbonate resin: 22,000, manufactured by Mitsubishi Engineering-Plastics Corporation) as an aromatic polycarbonate (PC) were blended at the composition shown in Table 11, and mixed to obtain a mixture. This mixture was supplied to a devolatilizing twin-screw extruder (PCM-30 manufactured by Ikegai Iron Works, Ltd.) which had been heated to a barrel temperature of 260° C., and kneaded to prepare pellets of the resin composition of Example 7, in which 7.5% by mass of the rubber-containing graft polymer (A-4) was blended.

A pellet of each of resin compositions of Comparative Examples 10 and 11 was prepared in the same manner as in Example 7, except that the type and/or the use amount of the rubber-containing graft polymer and the blend amount of the other raw materials were changed to the conditions shown in Table 11.

Furthermore, "AP-H" (trade name, manufactured by Techno-UMG Co., Ltd., a nominal AN ratio is around 26%, Mw of about 110,000) was used as the styrene acrylonitrile resin (SAN), and "IUPILON" S-2000F "(trade name, manufactured by Mitsubishi Engineering-Plastics Corporation, My of a nominal aromatic polycarbonate resin: 22,000) was used as the aromatic polycarbonate (PC). In addition, in Comparative Example 11, a butadiene-based rubber impact modifier (trade name: Kane Ace (registered trademark) M732, manufactured by Kaneka Corporation) was used instead of the rubber-containing graft polymer.

TABLE 11

|  | Example 7 | Comparative Example 10 | Comparative Example 11 |
| --- | --- | --- | --- |
| SAN | 22.5 | 22.5 | 22.5 |
| PC | 70 | 70 | 70 |
| A-4 | 7.5 |  |  |
| B-6 |  | 7.5 |  |
| MBS1 |  |  | 7.5 |

Furthermore, the symbols in the table have the following meanings.
SAN: Styrene acrylonitrile resin ("AP-H")
PC: Aromatic polycarbonate resin ("IUPILON S-2000F")
MBS1: Butadiene-based rubber impact modifier ("Kane Ace M732")

The respective pellets were separately supplied to a Sumitomo injection molding machine SE100DU (manufactured by Sumitomo Heavy Industries, Ltd.) to obtain shaped article having a length of 80 mm×a width of 10 mm×a thickness of 4 mm (a specimen for Charpy impact strength), a specimen for tensile specified by JIS-7139, and a flat plate having a length of 100 mm×a width of 50 mm×a thickness of 2 mm at a cylinder temperature of 260° C. and a mold temperature of 60° C. The evaluations described below were performed using each of the shaped articles. The evaluation results are shown in Table 12.

[Charpy Impact Test]
A Charpy impact test was measured, based on ISO-179-1 and by cutting a TYPE A notch based on ISO 2818.

[Tensile Test]
A tensile test was measured, based on ISO-527 and at a tensile speed of 20 mm/min.

[Color Tone]
A color tone/YI of a flat plate having a thickness of 2 mm was measured using a color difference meter (model: SE-2000) manufactured by Nippon Denshoku Industries Co., Ltd. in accordance with ASTM-E1925.

[Wet Heat Test]
The flat plate having a thickness of 2 mm was allowed to stand in a thermo-hygrostat set at a relative humidity of 95% and a temperature of 90° C. for 160 hours, and a color tone/YI was measured by a measurement method using a color difference meter (model: SE-2000) manufactured by Nippon Denshoku Industries Co., Ltd. in accordance with ASTM-E1925. Further, the tensile specimen was subjected to a wet heat treatment at 120° C. for 72 hours under a 100% RH condition using a pressure cooker (trade name: PC304RIII, manufactured by Hirayama Seisakusho Co., Ltd.) and then subjected to a tensile test at a tensile speed of 1 mm/min.

[Weld Strength]
The respective pellets were separately supplied to a Sumitomo injection molding machine SE100DU (manufactured by Sumitomo Heavy Industries, Ltd.) and a multipurpose specimen (A1) specified by JIS-7139 at a cylinder temperature of 260° C. and a mold temperature of 60° C.

At this time, a corresponding specimen was obtained according to the following procedure.

(1) A specimen was manufactured by adjusting an injection pressure and a holding pressure during injection molding at a two-point gate to locate a welding line at the center of the specimen (FIG. 1a).

(2) A specimen shown in FIG. 1b was manufactured by lowering the holding pressure in (1) by 4 MPa.

(3) A specimen shown in FIG. 1c was manufactured by lowering the holding pressure in (2) by 4 MPa.

The tensile test was performed according to ISO-527 and the tensile speed was 20 mm/min. The weld strength in the evaluation of the present invention is defined as a yield strength (a maximum strength in a case where no yield point appears) and a elongation at break in the tensile test of the specimens shown in FIGS. 1a and 1c.

TABLE 12

|  |  |  | Example 1 | Comparative Example 1 | Comparative Example 2 | Comparative Example 3 |
| --- | --- | --- | --- | --- | --- | --- |
| Thermoplastic resin | PBT (parts by mass) |  | 85 | 85 | 85 | 85 |
| Rubber-containing graft polymer | Production Example | A-1 (parts by mass) | 15 |  |  |  |
|  |  | B-1 (parts by mass) |  | 15 |  |  |
|  |  | B-2 (parts by mass) |  |  | 15 |  |
|  |  | B-3 (parts by mass) |  |  |  | 15 |

TABLE 12-continued

|  |  |  | Example 1 | Comparative Example 1 | Comparative Example 2 | Comparative Example 3 |
|---|---|---|---|---|---|---|
|  | Emulsifier |  | P | S | S | P |
|  | Graft polymerization | Initiator | KPS | tBH | KPS | tBH |
|  |  | Reducing agent |  | SFS |  | SFS |
|  | Particle diameter [nm] of rubber |  | 230 | 230 | 200 | 250 |
|  | Residual elements | Phosphorus [mmol/kg] | 6 | 0.1 | 0.1 | 8 |
|  |  | Sodium [ppm] | 2 | 2 | 2 | 2 |
|  | Organic solvent-soluble fraction | Components having molecular weight of 800,000 or more [% by mass] | 26.7 | 0.1 | 25.5 | 0.1 |
|  |  | Weight-average molecular weight [×10,000] | 65 | 11 | 55 | 6 |
| Resin composition | Charpy impact strength [kJ/m²] | 23° C. | 14 | 9 | 12 | 8 |
|  |  | 0° C. | 11 | 8 | 9 | 8 |
|  | Tensile characteristics | Maximum point strength [MPa] | 38 | 36 | 36 | 36 |
|  |  | Elongation at break [ %] | 248 | 161 | 256 | 178 |
|  |  | Maximum point strength [MPa] after wet heat test | 38 | 26 | 29 | 28 |
|  | Color tune | YI | 2 | 2 | 2 | 3 |
|  |  | ΔYI (YI after wet heat test − YI before wet heat test) | 0.1 | 0.4 | 0.3 | 0.1 |

Furthermore, the symbols in the table have the following meanings.
PBT: Polybutylene terephthalate resin ("NOVADURAN (registered trademark) 5010 R5")
P (for Emulsifier): Sodium tridecyloxyhexaoxyethylene phosphate ("PHOSPHANOL (registered trademark) RS-610NA", manufactured by Toho Chemical Industry Co., Ltd.)
S (for Emulsifier): Sodium dodecylbenzenesulfonate ("NEOPELEX G-15", manufactured by Kao Corporation) and sodium dialkyl sulfosuccinate ("PELEX OT-P", manufactured by Kao Corporation)
SFS: Sodium formaldehyde sulfoxylate

TABLE 13

|  |  |  |  | Example |  |  |  |  | Comparative Example |  |  |  |  |  |
|---|---|---|---|---|---|---|---|---|---|---|---|---|---|---|
|  |  |  |  | 2 | 3 | 4 | 5 | 6 | 4 | 5 | 6 | 7 | 8 | 9 |
| Thermoplastic resin | PBT (parts by mass) |  |  | 36 | 36 | 36 | 36 | 36 | 36 | 36 | 36 | 36 | 36 | 36 |
|  | PC (parts by mass) |  |  | 54 | 54 | 54 | 54 | 54 | 54 | 54 | 54 | 54 | 54 | 54 |
| Rubber-containing graft polymer | Production Example | A-1 (parts by mass) |  | 10 |  |  |  |  |  |  |  |  |  |  |
|  |  | A-2 (parts by mass) |  |  | 10 |  |  |  |  |  |  |  |  |  |
|  |  | A-3 (parts by mass) |  |  |  | 10 |  |  |  |  |  |  |  |  |
|  |  | A-5 (parts by mass) |  |  |  |  | 10 |  |  |  |  |  |  |  |
|  |  | A-6 (parts by mass) |  |  |  |  |  | 10 |  |  |  |  |  |  |
|  |  | B-1 (parts by mass) |  |  |  |  |  |  | 10 |  |  |  |  |  |
|  |  | B-2 (parts by mass) |  |  |  |  |  |  |  | 10 |  |  |  |  |
|  |  | B-3 (parts by mass) |  |  |  |  |  |  |  |  | 10 |  |  |  |
|  |  | B-4 (parts by mass) |  |  |  |  |  |  |  |  |  | 10 |  |  |

TABLE 13-continued

|  |  |  | Example | | | | | Comparative Example | | | | | |
| --- | --- | --- | --- | --- | --- | --- | --- | --- | --- | --- | --- | --- | --- |
|  |  |  | 2 | 3 | 4 | 5 | 6 | 4 | 5 | 6 | 7 | 8 | 9 |
|  |  | B-5 (parts by mass) |  |  |  |  |  |  |  |  |  | 10 |  |
|  |  | B-7 (parts by mass) |  |  |  |  |  |  |  |  |  |  | 10 |
|  | Emulsifier |  | P | P | P | P | SP | S | S | P | S | S | S |
|  | Graft polymerization | Initiator | KPS | KPS | KPS | KPS | KPS | tBH SFS | KPS | tBH SFS | KPS | tBH SFS | tBH SFS |
|  |  | Reducing agent |  |  |  |  |  |  |  |  |  |  |  |
|  | Particle diameter [nm] of rubber |  | 230 | 88 | 170 | 88 | 210 | 230 | 200 | 250 | 92 | 180 | 210 |
|  | Residual elements | Phosphorus [mmol/kg] | 6 | 6 | 12 | 10 | 14 | 0.1 | 0.1 | 8 | 0.1 | 2 | 0.2 |
|  |  | Sodium [ppm] | 2 | 1 | 3 | 6 | 4 | 2 | 2 | 2 | 2 | 45 | 3 |
|  | Organic solvent-soluble fraction | Components having molecular weight of 800,000 or more [% by mass] | 26.7 | 12.7 | 14.2 | 1.3 | 5.0 | 0.1 | 25.5 | 0.1 | 5.0 | 0 | 14.7 |
|  |  | Weight-average molecular weight [× 10,000] | 65 | 32 | 33 | 8 | 21 | 11 | 55 | 6 | 21 | 5 | 42 |
| Resin composition | Tensile characteristics | Maximum point strength [MPa] | 56 | 54 | 53 | 57 | 54 | 50 | 51 | 51 | 50 | 50 | 49 |
|  |  | Elongation at break [%] | 141 | 141 | 135 | 133 | 143 | 81 | 83 | 117 | 140 | 116 | 33 |
|  | Color tune | YI | 3 | 4 | 10 | 3 | 5 | 6 | 9 | 2 | 21 | 15 | 13 |

Furthermore, the symbols in the table have the following meanings.
PBT: Polybutylene terephthalate resin ("NOVADURAN (registered trademark) 5010 R5")
PC: Aromatic polycarbonate resin ("IUPILON (registered trademark) S-2000F")
P (for Emulsifier): Sodium tridecyloxyhexaoxyethylene phosphate ("PHOSPHANOL (registered trademark) RS-610NA", manufactured by Toho Chemical Industry Co., Ltd.) or "PHOSPHANOL (registered trademark) RS-610", manufactured by Toho Chemical Industry Co., Ltd.)
S (for Emulsifier): Sodium dodecylbenzenesulfonate ("NEOPELEX G-15", manufactured by Kao Corporation) and/or sodium dialkyl sulfosuccinate ("PELEX OT-P", manufactured by Kao Corporation), or sodium alkyl diphenyl ether disulfonate ("PELEX SS-L", manufactured by Kao Corporation")
SP (for Emulsifier): SP indicates that S and P were used in combination.
SFS: Sodium formaldehyde sulfoxylate

TABLE 14

|  |  |  | Example 7 | Comparative Example 10 | Comparative Example 11 |
| --- | --- | --- | --- | --- | --- |
| Thermoplastic resin | SAN (parts by mass) |  | 22.5 | 22.5 | 22.5 |
|  | PC (parts by mass) |  | 70 | 70 | 70 |
| Rubber-containing graft polymer | Production Example | A-4 (parts by mass) | 7.5 |  |  |
|  |  | B-6 (parts by mass) |  | 7.5 |  |
|  |  | MBS1 (parts by mass) |  |  | 7.5 |
|  | Emulsifier |  | P | S |  |
|  | Graft polymerization | Initiator | KPS | tBH |  |
|  |  | Reducing agent |  | SFS |  |
|  | Particle diameter [nm] of rubber |  | 170 | 180 |  |
|  | Residual elements | Phosphorus [mmol/kg] | 14 | 2 | 24 |
|  |  | Sodium [ppm] | 4 | 45 | 8 |
|  | Organic solvent-soluble fraction | Components having molecular weight of 800,000 or more [% by mass] | 14.6 | 0 | 0.9 |
|  |  | Weight-average molecular weight [×10,000] | 40 | 4 | 5 |

TABLE 14-continued

|  |  |  | Example 7 | Comparative Example 10 | Comparative Example 11 |
|---|---|---|---|---|---|
| Resin composition | Charpy impact strength [kJ/m$^2$] | 23° C. | 55 | 54 | 54 |
|  |  | −30° C. | 34 | 32 | 19 |
| Weld strength | Two-point gate (FIG. 1a) | Yield strength [MPa] | 43 | 43 | 35 |
|  |  | Elongation at break [%] | 3.1 | 2.7 | 2.4 |
|  | Two-point gate (FIG. 1e) | Yield strength [MPa] | 45 | 26 | 32 |
|  |  | Elongation at break [%] | 3.3 | 1.6 | 2.2 |

Furthermore, the symbols in the table have the following meanings.
SAN: Styrene acrylonitrile resin ("AP-H")
PC: Aromatic polycarbonate resin ("IUPILON (registered trademark) S-2000F")
MBS1: Butadiene-based rubber impact modifier (trade name: Kane Ace (registered trademark) M732, manufactured by Kaneka Corporation)
P (in emulsifier): Sodium polyoxyethylene (4) alkyl ether phosphate ("PHOSPHANOL (registered trademark) RD-510Y", manufactured by Toho Chemical Industry Co., Ltd.)
S (for Emulsifier): Sodium alkyldiphenyl ether disulfonate ("PELEX SS-L, manufactured by Kao Corporation")
SFS: Sodium formaldehyde sulfoxylate As shown in Table 12, a thermoplastic resin composition using the rubber-containing graft polymer of the present invention, which has a predetermined phosphorus content and contains components having a weight-average molecular weight of 800,000 or more in an organic solvent-soluble fraction at a predetermined ratio, has excellent mechanical strength. In addition, the tensile strength after the wet heat test was high and the color tone change (variation in the YI value) was small. This shows that the phosphorus-based emulsifier deactivates the polymerization catalyst included in the polybutylene terephthalate resin (PBT) and suppresses the decomposition of PBT, thereby improving the wet heat stability.

Furthermore, as shown in Table 13, a polybutylene terephthalate resin/aromatic polycarbonate resin-based alloy composition using the rubber-containing graft polymer of the present invention not only exhibits a good tensile strength but also has a small YI of a shaped article. This shows that the rubber is uniformly dispersed in the resin by an increase in the molecular weight of a graft chain, and therefore, the mechanical properties are improved, the decomposition or transesterification of the polybutylene terephthalate resin and the aromatic polycarbonate resin is suppressed by a phosphorus-based emulsifier, and yellow coloring is alleviated.

Moreover, as shown in Table 14, a styrene acrylonitrile resin/aromatic polycarbonate resin-based (PC/SAN) alloy composition using the rubber-containing graft polymer of the present invention has excellent impact strength at a low temperature. In addition, it can be seen that although the PC/SAN alloy composition originally has a low weld strength, the weld strength is improved by using the rubber-containing graft polymer of the present invention.

The invention claimed is:

1. A rubber-containing graft polymer obtained by graft-polymerizing grafting vinyl monomers to a rubber latex, comprising:
grafted rubber crosslinking components including a graft chain derived from the grafting vinyl monomers (Rg);
non-grafted rubber crosslinking components (R0);
grafted rubber non-crosslinking components including a graft chain derived from the grafting vinyl monomers (Ng); and
rubber non-crosslinking components (N0);
wherein
an organic solvent-insoluble fraction of the rubber-containing graft polymer is a component of Rg and R0,
the rubber-containing graft polymer comprises 92 wt % to 99.5 wt % of the organic solvent-insoluble fraction,
a content of components having a weight-average molecular weight of 800,000 or more is 1% by mass or more with respect to 100% by mass of an organic solvent-soluble fraction of the rubber-containing graft polymer, and
a phosphorus content in the rubber-containing graft polymer is 3 to 30 mmol/kg.

2. The rubber-containing graft polymer according to claim 1, wherein a sodium content in the rubber-containing graft polymer is 30 ppm by mass or less.

3. The rubber-containing graft polymer according to claim 1, wherein a weight-average molecular weight of the organic solvent-soluble fraction is 250,000 or more.

4. The rubber-containing graft polymer according to claim 1, wherein the content of components having a weight-average molecular weight of 800,000 or more with respect to the organic solvent-soluble fraction (100% by mass) is 1.3% by mass or more.

5. The rubber-containing graft polymer according to claim 1, wherein the content of components having a weight-average molecular weight of 800,000 or more with respect to the organic solvent-soluble fraction (100% by mass) is 5% by mass or more.

6. The rubber-containing graft polymer according to claim 1, wherein a volume-average particle diameter of the rubber to be grafted is 50 to 400 nm.

7. A rubber-containing graft polymer obtained by emulsion-graft- polymerizing grafting monomers containing a methacrylate alkyl ester to a diene-based rubber latex using a persulfate and a phosphorus-based emulsifier, the diene-based rubber latex being obtained by polymerization using a phosphorus-based emulsifier, comprising grafted rubber crosslinking components including a graft chain derived from the grafting vinyl monomers (Rg);

non-grafted rubber crosslinking components (R0);

grafted rubber non-crosslinking components including a graft chain derived from the grafting vinyl monomers (Ng); and rubber non-crosslinking components (N0);

wherein an organic solvent-insoluble fraction of the rubber-containing graft polymer is a component of Rg and R0, and the rubber-containing graft polymer comprises 92 wt % to 99.5 wt % of the organic solvent-insoluble fraction, and a content of components having a weight-average molecular weight of 800,000 or more is 1% by mass or more with respect to 100% by mass of an organic solvent-soluble fraction of the rubber-containing graft polymer.

8. A resin composition containing a rubber-containing graft polymer, comprising:

the rubber-containing graft polymer according to claim 1; and a thermoplastic resin (B).

9. The resin composition containing a rubber-containing graft polymer according to claim 8, wherein the thermoplastic resin (B) includes a polyester resin.

10. The resin composition containing a rubber-containing graft polymer according to claim 8, wherein the thermoplastic resin (B) includes an aromatic polycarbonate resin.

11. The resin composition containing a rubber-containing graft polymer according to claim 8, wherein the thermoplastic resin (B) is an alloy of a polyester resin and an aromatic polycarbonate resin.

12. A shaped article obtained by shaping the resin composition containing a rubber- containing graft polymer according to claim 8.

13. The shaped article according to claim 12, wherein the shaped article is an injection shaped article.

14. The rubber-containing graft polymer according to claim 7, obtained by coagulation with calcium acetate.

\* \* \* \* \*